US011483104B2

(12) United States Patent
Shao et al.

(10) Patent No.: US 11,483,104 B2
(45) Date of Patent: Oct. 25, 2022

(54) CHANNEL STATE INFORMATION REPORT TRANSMISSIONS METHOD AND COMMUNICATIONS DEVICE

(71) Applicant: Huawei Technologies Co., Ltd., Shenzhen (CN)

(72) Inventors: Jiafeng Shao, Beijing (CN); Yongxia Lyu, Ottawa (CA); Xinghua Song, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 103 days.

(21) Appl. No.: 16/875,363

(22) Filed: May 15, 2020

(65) Prior Publication Data
US 2020/0287670 A1    Sep. 10, 2020

Related U.S. Application Data

(63) Continuation of application No. PCT/CN2018/111863, filed on Oct. 25, 2018.

(30) Foreign Application Priority Data

Nov. 17, 2017 (CN) .......................... 201711148426.1

(51) Int. Cl.
*H04W 4/00* (2018.01)
*H04L 1/20* (2006.01)
(Continued)

(52) U.S. Cl.
CPC .......... *H04L 1/203* (2013.01); *H04L 1/0026* (2013.01); *H04L 1/1887* (2013.01);
(Continued)

(58) Field of Classification Search
None
See application file for complete search history.

(56) References Cited

U.S. PATENT DOCUMENTS

2008/0220792 A1* 9/2008 Fischer ................. H04W 28/18
455/452.2
2011/0134780 A1* 6/2011 Jersenius ................ H04L 1/003
370/252
(Continued)

FOREIGN PATENT DOCUMENTS

CN    102845097 A    12/2012
CN    103098400 A    5/2013
(Continued)

OTHER PUBLICATIONS

Samsung et al., "WF for Open Issues on CSI Reporting," 3GPP TSG-RAN WG1 NR-AH3, R1-1716901, Nagoya, Japan, Sep. 18-21, 2017, 19 pages.
(Continued)

*Primary Examiner* — Bob A Phunkulh
(74) *Attorney, Agent, or Firm* — Slater Matsil, LLP

(57) ABSTRACT

This application provides a channel state information report transmission method and a communications device. The method includes: determining N channel state information reports; and sending M of the N channel state information reports based on priorities of the N channel state information reports, where both N and M are positive integers greater than or equal to 1, and M is less than or equal to N; and a priority of a channel state information report in the N channel state information reports.

12 Claims, 16 Drawing Sheets

(51) Int. Cl.

| | | |
|---|---|---|
| *H04L 1/00* | (2006.01) | |
| *H04L 1/18* | (2006.01) | |
| *H04L 5/00* | (2006.01) | |
| *H04W 8/24* | (2009.01) | |
| *H04W 72/04* | (2009.01) | |
| *H04W 80/08* | (2009.01) | |
| *H04W 28/02* | (2009.01) | |

(52) U.S. Cl.
CPC ............ *H04L 5/0064* (2013.01); *H04W 8/24* (2013.01); *H04W 72/042* (2013.01); *H04W 80/08* (2013.01); *H04W 28/0231* (2013.01); *H04W 28/0252* (2013.01); *H04W 28/0268* (2013.01)

(56) References Cited

U.S. PATENT DOCUMENTS

| | | | | |
|---|---|---|---|---|
| 2014/0169204 | A1* | 6/2014 | Cheng | H04L 1/0026 370/252 |
| 2014/0328255 | A1* | 11/2014 | Sairamesh | H04L 25/0224 370/329 |
| 2016/0226649 | A1* | 8/2016 | Papasakellariou | H04L 1/0001 |
| 2016/0278072 | A1* | 9/2016 | Palle | H04W 72/10 |
| 2016/0337874 | A1 | 11/2016 | Yang et al. | |
| 2017/0006437 | A1* | 1/2017 | Guo | H04W 72/0413 |
| 2017/0295578 | A1* | 10/2017 | Khoshnevisan | H04W 72/082 |
| 2019/0036829 | A1* | 1/2019 | Ji | H04W 76/28 |
| 2019/0037428 | A1* | 1/2019 | Strom | H04B 7/0632 |
| 2019/0190629 | A1* | 6/2019 | Lin | H04B 17/336 |
| 2020/0145069 | A1* | 5/2020 | Ferrante | H04B 7/0608 |
| 2020/0169902 | A1* | 5/2020 | Yasukawa | H04W 28/0236 |

FOREIGN PATENT DOCUMENTS

| | | |
|---|---|---|
| CN | 103918334 A | 7/2014 |
| CN | 106411465 A | 2/2017 |
| CN | 107113151 A | 8/2017 |
| WO | 2017075802 A1 | 5/2017 |

OTHER PUBLICATIONS

Huawei et al., "Link adaption and CSI reporting for URLLC transmission", 3GPP TSG RAN WG1 Meeting NR#3, R1-1715414, Nagoya, Japan, Sep. 18-21, 2017, 10 pages.

Vivo, "Discussion on CSI report for URLLC", 3GPP TSG RAN WG1 Meeting #93, R1-1806077, Busan, Korea, May 21-25, 2018, 2 pages.

Huawei et al., "Link adaptation for DL URLLC", 3GPP TSG RAN WG1 Meeting #88bis, R1-1704220, Spokane, WA, USA, Apr. 3-7, 2017, 5 pages.

Huawei et al., "Support of URLLC in DL", 3GPP TSG RAN WG1 Adhoc Meeting, R1-1700401, Spokane, WA, USA, Jan. 16-20, 2017, 7 pages.

* cited by examiner

CHANNEL STATE INFORMATION REPORT TRANSMISSIONS METHOD AND COMMUNICATIONS DEVICE

CROSS-REFERENCE TO RELATED APPLICATIONS

This application is a continuation of International Patent Application No. PCT/CN2018/111863, filed on Oct. 25, 2018, which claims priority to Chinese Patent Application No. 201711148426.1, filed on Nov. 17, 2017. The disclosures of the aforementioned applications are hereby incorporated by reference in their entireties.

TECHNICAL FIELD

This application relates to the field of communications technologies, and in particular, to a channel state information report transmission method and a communications device.

BACKGROUND

In a communications system, a network device allocates a downlink resource to a terminal device based on a channel state information report reported by the terminal device, for example, channel state information (CSI). In a 5th generation (5G) new radio (NR) mobile communications system, a block error rate (BLER) that needs to be supported by some services such as an ultra-reliable low-latency communication (URLLC) service may be different from an existing BLER, and channel state information reports corresponding to different BLERs include different information. Based on this, how to transmit a channel state information report to ensure reliability of the 5G NR system is a technical problem to be urgently resolved in this application.

SUMMARY

This application provides a channel state information report transmission method and a communications device, to improve system reliability.

According to a first aspect, this application provides a channel state information report transmission method, including: determining N channel state information reports; and sending M of the N channel state information reports based on priorities of the N channel state information reports, where both N and M are positive integers greater than or equal to 1, and M is less than or equal to N; and the priority of the channel state information report is determined based on a priority of a block error rate (BLER) corresponding to the channel state information report.

Beneficial effects of this application include: In this application, when transmitting the channel state information report, a communications apparatus considers the priority of the BLER, to adapt to a requirement of a 5G NR system, so as to improve reliability of the mobile communications system.

Optionally, before the sending M of the N channel state information reports based on priorities of the N channel state information reports, the method further includes: determining, based on at least one piece of information of at least one of the N channel state information reports, a BLER corresponding to the at least one channel state information report.

Optionally, before the sending M of the N channel state information reports based on priorities of the N channel state information reports, the method further includes: receiving first indication information; and determining, based on a format of the first indication information, a BLER corresponding to at least one of the N channel state information reports.

Beneficial effects of this application include: The BLER may be determined in the foregoing two manners, so that the communications apparatus considers the priority of the BLER, to adapt to the requirement of the 5G NR system, so as to improve reliability of the mobile communications system.

Optionally, before the sending M of the N channel state information reports based on priorities of the N channel state information reports, the method further includes: receiving second indication information, where the second indication information is used to indicate that only a channel state information report corresponding to one BLER can be sent; and the second indication information is higher layer signaling or downlink control information (DCI).

Optionally, the priority of the BLER is predefined; or the priority of the BLER is determined based on the higher layer signaling; or the priority of the BLER is determined based on the downlink control information (DCI).

Beneficial effects of this application include: In this application, the communications apparatus can effectively determine the priority of the BLER in the foregoing three methods, can determine the priority of the channel state information report based on the priority of the BLER, and send the channel state information report based on the priority, to improve system reliability.

Optionally, a quantity of bits of the N channel state information reports is greater than a maximum quantity of carried bits on an uplink channel; a quantity of bits of the M channel state information reports is less than or equal to the maximum quantity of carried bits; and the uplink channel is used to transmit the M channel state information reports; or a sum of a quantity of bits of the N channel state information reports and a quantity of bits of at least one piece of information is greater than a maximum quantity of carried bits on an uplink channel; a sum of a quantity of bits of the M channel state information reports and the quantity of bits of the at least one piece of information is less than or equal to the maximum quantity of carried bits; and the uplink channel is used to transmit the M channel state information reports and the at least one piece of information.

Optionally, the maximum quantity of carried bits is determined based on at least one of the following: a maximum bit rate that the uplink channel can support for carrying information, a time domain resource occupied by the uplink channel, a frequency domain resource occupied by the uplink channel, and a format of the uplink channel.

The following describes a channel state information report transmission method performed on a network device side. An implementation principle and a technical effect of the method are similar to those of the first aspect and the optional manners corresponding to the first aspect. Details are not described herein again.

According to a second aspect, this application provides a channel state information report transmission method, including: receiving M channel state information reports, where the M channel state information reports are determined based on priorities of N channel state information reports, both N and M are positive integers greater than or equal to 1, and M is less than or equal to N.

Optionally, the method further includes: sending first indication information, where the first indication information is used to determine a block error rate (BLER) corresponding to a channel state information report.

Optionally, the method further includes: sending second indication information, where the second indication information is used to indicate that only a channel state information report corresponding to one BLER can be sent; and the second indication information is higher layer signaling or downlink control information (DCI).

Optionally, a priority of the BLER is predefined; or a priority of the BLER is determined based on the higher layer signaling; or a priority of the BLER is determined based on the downlink control information (DCI).

Optionally, a quantity of bits of the N channel state information reports is greater than a maximum quantity of carried bits on an uplink channel; a quantity of bits of the M channel state information reports is less than or equal to the maximum quantity of carried bits; and the uplink channel is used to transmit the M channel state information reports; or a sum of a quantity of bits of the N channel state information reports and a quantity of bits of at least one piece of information is greater than a maximum quantity of carried bits on an uplink channel; a sum of a quantity of bits of the M channel state information reports and the quantity of bits of the at least one piece of information is less than or equal to the maximum quantity of carried bits; and the uplink channel is used to transmit the M channel state information reports and the at least one piece of information.

Optionally, the maximum quantity of carried bits is determined based on at least one of the following: a maximum bit rate that the uplink channel can support for carrying information, a time domain resource occupied by the uplink channel, a frequency domain resource occupied by the uplink channel, and a format of the uplink channel.

According to a third aspect, this application provides a channel state information report transmission method, including: determining, based on a correspondence and a block error rate (BLER) corresponding to a channel state information report, at least one uplink channel used to send the channel state information report, where the correspondence includes a correspondence between the block error rate (BLER) and the at least one uplink channel; and sending the channel state information report on the at least one uplink channel.

Beneficial effects of this application include: This application provides the method for determining, based on the correspondence and the BLER corresponding to the channel state information report, the uplink channel used to send the channel state information report, to improve system reliability.

Optionally, the BLER corresponding to the channel state information report includes a first BLER and a second BLER. The at least one uplink channel includes a first uplink channel corresponding to the first BLER and a second uplink channel corresponding to the second BLER. The first uplink channel is an uplink channel configured for HARQ information. The second uplink channel is an uplink channel configured only for the channel state information report.

Beneficial effects of this application include: The uplink channel corresponding to the channel state information report can be effectively determined by using the method.

Optionally, a priority of the first BLER is lower than or equal to a priority of the second BLER.

Beneficial effects of this application include: In this application, a communications apparatus can generate the HARQ information only after demodulating data, and therefore, a delay of generating the HARQ information is relatively long. In addition, the uplink channel used to transmit the HARQ information may be further used to transmit the channel state information report. Therefore, once a load of the uplink channel used to transmit the HARQ information reaches a maximum quantity of carried bits, the HARQ information is more important, and consequently, a problem of dropping the channel state information report easily occurs. Based on this, in this application, a channel state information report with a relatively low priority is sent together with the HARQ information, to improve reliability of transmitting the channel state information report by a system.

Optionally, the method further includes: receiving indication information, where the indication information includes first indication sub-information and second indication sub-information; the first indication sub-information is used to indicate a first uplink channel set; the second indication sub-information is used to indicate a second uplink channel set; the first uplink channel set includes the first uplink channel; and the second uplink channel set includes the second uplink channel.

Optionally, the correspondence is predefined; or the correspondence is determined based on higher layer signaling; or the correspondence is determined based on downlink control information (DCI).

Optionally, the block error rate (BLER) corresponding to the channel state information report includes the first BLER and the second BLER. The at least one uplink channel is a same uplink channel corresponding to the first BLER and the second BLER.

Beneficial effects of this application include: The uplink channel corresponding to the channel state information report can be effectively determined by using the method.

Optionally, the block error rate (BLER) corresponding to the channel state information report includes the first BLER or the second BLER. The at least one uplink channel includes the first uplink channel corresponding to the first BLER or the second uplink channel corresponding to the second BLER. Both the first uplink channel and the second uplink channel are uplink channels configured for the hybrid automatic repeat request (HARQ) information.

Beneficial effects of this application include: The uplink channel corresponding to the channel state information report can be effectively determined by using the method.

Optionally, the block error rate (BLER) corresponding to the channel state information report includes N BLERs, and N is a positive integer greater than or equal to 1. When N is equal to 1, the at least one uplink channel includes a first uplink channel corresponding to the N BLERs; or when N is greater than 1, the at least one uplink channel includes a second uplink channel corresponding to the N BLERs.

Beneficial effects of this application include: The uplink channel corresponding to the channel state information report can be effectively determined by using the method.

The following describes a channel state information report transmission method performed on a communications apparatus side. Some optional manners of the method are the same as some optional manners corresponding to the second aspect. An implementation principles and a technical effect of the method are similar to those of the second aspect. Details are not described herein again.

According to a fourth aspect, this application provides a channel state information report transmission method, including: determining a block error rate (BLER) based on a correspondence and at least one uplink channel, where the correspondence includes a correspondence between the block error rate (BLER) and the at least one uplink channel; determining a channel state information report corresponding to the BLER; and sending the channel state information report on the at least one uplink channel.

Beneficial effects of this application include: This application provides the method for determining the BLER based on the correspondence and the at least one uplink channel, to improve system reliability.

Optionally, the BLER corresponding to the channel state information report includes a first BLER and a second BLER. The at least one uplink channel includes a first uplink channel corresponding to the first BLER and a second uplink channel corresponding to the second BLER. The first uplink channel is an uplink channel configured for HARQ information. The second uplink channel is an uplink channel configured only for the channel state information report.

Optionally, a priority of the first BLER is lower than or equal to a priority of the second BLER.

Optionally, the method further includes: receiving indication information, where the indication information includes first indication sub-information and second indication sub-information; the first indication sub-information is used to indicate a first uplink channel set; the second indication sub-information is used to indicate a second uplink channel set; the first uplink channel set includes the first uplink channel; and the second uplink channel set includes the second uplink channel.

Optionally, the correspondence is predefined; or the correspondence is determined based on higher layer signaling; or the correspondence is determined based on downlink control information (DCI).

Optionally, the block error rate (BLER) corresponding to the channel state information report includes the first BLER and the second BLER. The at least one uplink channel is a same uplink channel corresponding to the first BLER and the second BLER.

Optionally, the block error rate (BLER) corresponding to the channel state information report includes the first BLER or the second BLER. The at least one uplink channel includes the first uplink channel corresponding to the first BLER or the second uplink channel corresponding to the second BLER. Both the first uplink channel and the second uplink channel are uplink channels configured for the hybrid automatic repeat (HARQ) information.

Optionally, the block error rate (BLER) corresponding to the channel state information report includes N BLERs, and N is a positive integer greater than or equal to 1. When N is equal to 1, the at least one uplink channel includes a first uplink channel corresponding to the N BLERs; or when N is greater than 1, the at least one uplink channel includes a second uplink channel corresponding to the N BLERs.

The following describes a channel state information report transmission method performed on a network device side. Some optional manners of the method are the same as some optional manners corresponding to the second aspect. An implementation principle and a technical effect of the method are similar to those of the second aspect. Details are not described herein again.

According to a fifth aspect, this application provides a channel state information report transmission method, including: receiving a channel state information report on at least one uplink channel; and determining, based on the at least one uplink channel and a correspondence, a block error rate (BLER) corresponding to the channel state information report, where the correspondence includes a correspondence between the block error rate (BLER) and the at least one uplink channel.

Beneficial effects of this application include: This application provides the method for determining the BLER based on the correspondence and the at least one uplink channel, to improve system reliability.

Optionally, the BLER corresponding to the channel state information report includes a first BLER and a second BLER. The at least one uplink channel includes a first uplink channel corresponding to the first BLER and a second uplink channel corresponding to the second BLER. The first uplink channel is an uplink channel configured for hybrid automatic repeat (HARQ) information. The second uplink channel is an uplink channel configured only for the channel state information report.

Optionally, a priority of the first BLER is lower than or equal to a priority of the second BLER.

Optionally, the method further includes: sending indication information, where the indication information includes first indication sub-information and second indication sub-information; the first indication sub-information is used to indicate a first uplink channel set; the second indication sub-information is used to indicate a second uplink channel set; the first uplink channel set includes the first uplink channel; and the second uplink channel set includes the second uplink channel.

The following describes a channel state information report transmission method performed on a network device side. Some optional manners of the method are the same as some optional manners corresponding to the second aspect. An implementation principle and a technical effect of the method are similar to those of the second aspect. Details are not described herein again.

According to a sixth aspect, this application provides a channel state information report transmission method, including: determining a block error rate (BLER); determining, based on a correspondence and the BLER, at least one uplink channel used to send a channel state information report, where the correspondence includes a correspondence between the block error rate (BLER) and the at least one uplink channel; and receiving the channel state information report on the at least one uplink channel.

Beneficial effects of this application include: This application provides the method for determining, based on the correspondence and the BLER corresponding to the channel state information report, the uplink channel used to send the channel state information report, to improve system reliability.

Optionally, the correspondence is predefined; or the correspondence is determined based on higher layer signaling; or the correspondence is determined based on downlink control information (DCI).

Optionally, the block error rate (BLER) corresponding to the channel state information report includes a first BLER and a second BLER, and the at least one uplink channel is a same uplink channel corresponding to the first BLER and the second BLER.

Optionally, the block error rate (BLER) corresponding to the channel state information report includes a first BLER or a second BLER. The at least one uplink channel includes a first uplink channel corresponding to the first BLER or a second uplink channel corresponding to the second BLER. Both the first uplink channel and the second uplink channel are uplink channels configured for hybrid automatic repeat request (HARQ) information.

Optionally, the block error rate (BLER) corresponding to the channel state information report includes N BLERs, and N is a positive integer greater than or equal to 1. When N is equal to 1, the at least one uplink channel includes a first uplink channel corresponding to the N BLERs; or when N is greater than 1, the at least one uplink channel includes a second uplink channel corresponding to the N BLERs.

According to a seventh aspect, this application provides a communications device. The communications device is a communications apparatus and includes: a determining module, configured to determine N channel state information reports; and a sending module, configured to send M of the N channel state information reports based on priorities of the N channel state information reports, where both N and M are positive integers greater than or equal to 1, and M is less than or equal to N; and the priority of the channel state information report is determined based on a priority of a block error rate (BLER) corresponding to the channel state information report.

According to an eighth aspect, this application provides a communications device. The communications device is a network device and includes: a receiving module, configured to receive M channel state information reports, where the M channel state information reports are determined based on priorities of N channel state information reports, both N and M are positive integers greater than or equal to 1, and M is less than or equal to N.

According to a ninth aspect, this application provides a communications device. The communications device is a communications apparatus and includes: a determining module, configured to determine, based on a correspondence and a block error rate (BLER) corresponding to a channel state information report, at least one uplink channel used to send the channel state information report, where the correspondence includes a correspondence between the block error rate (BLER) and the at least one uplink channel; and a sending module, configured to send the channel state information report on the at least one uplink channel.

According to a tenth aspect, this application provides a communications device. The communications device is a communications apparatus and includes: a determining module, configured to determine a block error rate (BLER) based on a correspondence and at least one uplink channel, where the correspondence includes a correspondence between the block error rate (BLER) and the at least one uplink channel, where the determining module is further configured to determine a channel state information report corresponding to the BLER; and a sending module, configured to send the channel state information report on the at least one uplink channel.

According to an eleventh aspect, this application provides a communications device. The communications device is a network device and includes: a receiving module, configured to receive a channel state information report on at least one uplink channel; and a determining module, configured to determine, based on the at least one uplink channel and a correspondence, a block error rate (BLER) corresponding to the channel state information report, where the correspondence includes a correspondence between the block error rate (BLER) and the at least one uplink channel.

According to a twelfth aspect, this application provides a communications device. The communications device is a network device and includes: a determining module, configured to determine a block error rate (BLER), where the determining module is further configured to determine, based on a correspondence and the BLER, at least one uplink channel used to send a channel state information report, where the correspondence includes a correspondence between the block error rate (BLER) and the at least one uplink channel; and a receiving module, configured to receive the channel state information report on the at least one uplink channel.

According to a thirteenth aspect, this application provides a computer storage medium. The storage medium includes a computer instruction, and when the instruction is executed by a computer, the computer is enabled to implement the method in the first aspect and the optional manners of the first aspect.

According to a fourteenth aspect, this application provides a computer storage medium. The storage medium includes a computer instruction, and when the instruction is executed by a computer, the computer is enabled to implement the method in the second aspect and the optional manners of the second aspect.

According to a fifteenth aspect, this application provides a computer storage medium. The storage medium includes a computer instruction, and when the instruction is executed by a computer, the computer is enabled to implement the method in the third aspect and the optional manners of the third aspect.

According to a sixteenth aspect, this application provides a computer storage medium. The storage medium includes a computer instruction, and when the instruction is executed by a computer, the computer is enabled to implement the method in the fourth aspect and the optional manners of the fourth aspect.

According to a seventeenth aspect, this application provides a computer storage medium. The storage medium includes a computer instruction, and when the instruction is executed by a computer, the computer is enabled to implement the method in the fifth aspect and the optional manners of the fifth aspect.

According to an eighteenth aspect, this application provides a computer storage medium. The storage medium includes a computer instruction, and when the instruction is executed by a computer, the computer is enabled to implement the method in the sixth aspect and the optional manners of the sixth aspect.

According to a nineteenth aspect, this application provides a computer program product. When the computer program product is run on a communications device, the communications device is enabled to perform the method in the first aspect or the optional manners of the first aspect.

According to a twentieth aspect, this application provides a computer program product. When the computer program product is run on a communications device, the communications device is enabled to perform the method in the second aspect or the optional manners of the second aspect.

According to a twenty-first aspect, this application provides a computer program product. When the computer program product is run on a communications device, the communications device is enabled to perform the method in the third aspect or the optional manners of the third aspect.

According to a twenty-second aspect, this application provides a computer program product. When the computer program product is run on a communications device, the communications device is enabled to perform the method in the fourth aspect or the optional manners of the fourth aspect.

According to a twenty-third aspect, this application provides a computer program product. When the computer program product is run on a communications device, the communications device is enabled to perform the method in the fifth aspect or the optional manners of the fifth aspect.

According to a twenty-fourth aspect, this application provides a computer program product. When the computer program product is run on a communications device, the communications device is enabled to perform the method in the sixth aspect or the optional manners of the sixth aspect.

According to a twenty-fifth aspect, this application provides a channel state information report transmission method, including: determining N index values in a CQI table, where a modulation scheme corresponding to an index value X in the N index values is QPSK, and a corresponding bit rate multiplied by 1024 is less than or equal to 82; and sending at least one of the N index values.

Optionally, the bit rate that is multiplied by 1024 and that corresponds to the index value X is greater than or equal to 43; and/or an efficiency value is greater than or equal to 0.083579; and/or an efficiency value is less than or equal to 0.1592.

Optionally, the bit rate that is multiplied by 1024 and that corresponds to the index value X in the CQI table includes at least one of the following values: 82, 65, 54, 46, and 43.

Optionally, the bit rate that is multiplied by 1024 and that corresponds to the index value X and the efficiency value in the CQI table include at least one pair of the following values: {the bit rate is equal to 82, and the efficiency value is equal to 0.1592}, {the bit rate is equal to 65, and the efficiency value is equal to 0.1273}, {the bit rate is equal to 54, and the efficiency value is equal to 0.10612}, {the bit rate is equal to 46, and the efficiency value is equal to 0.0895}, and {the bit rate is equal to 43, and the efficiency value is equal to 0.083579}.

Optionally, the bit rate that is multiplied by 1024 and that corresponds to the index value X in the CQI table includes at least one of the following values: 81, 64, 59, 46, and 43.

Optionally, the bit rate that is multiplied by 1024 and that corresponds to the index value X and the efficiency value in the CQI table include at least one pair of the following values: {the bit rate is equal to 81, and the efficiency value is equal to 0.15851}, {the bit rate is equal to 71, and the efficiency value is equal to 0.13922}, {the bit rate is equal to 64, and the efficiency value is equal to 0.12578}, {the bit rate is equal to 59, and the efficiency value is equal to 0.11591}, and {the bit rate is equal to 55, and the efficiency value is equal to 0.1083}.

Optionally, an index value 12 to an index value 15 corresponds to a modulation scheme 16QAM.

Optionally, the N index values correspond to at least two coding schemes and one non-coding scheme. Details are as follows:

An index value o does not correspond to data or a coding scheme, the index value X corresponds to a coding scheme Polar, and an index value Y corresponds to a coding scheme LDPC. The index value Y is greater than the index value X.

Optionally, the CQI table corresponds to at least two BLERs. Details are as follows: The index value X corresponds to a first BLER, and the index value Y corresponds to a second BLER. The index value Y is greater than the index value X. Further, optionally, the second BLER is less than the first BLER.

Optionally, the N index values include that a quantity of index values corresponding to the coding scheme LDPC is greater than or equal to a quantity of index values corresponding to the coding scheme Polar.

Optionally, the CQI table corresponds to at least one BLER, and the BLER is at least one of the following: 10e-1, 10e-2, 10e-3, 10e-4, and 10e-5.

Optionally, the CQI table may include only an index, a modulation scheme, an efficiency value, and a bit rate, but does not include a coding scheme.

Beneficial effects of this application include: Because an existing LTE system supports only a 10e-1 CQI table, but a plurality of BLERs have been introduced into 5G NR, the prior-art table is not applicable to the 5G system. Further, in consideration of a URLLC service feature, a CQI table needs to be reported at a lower bit rate. Therefore, a CQI can be reported at different BLERs in this application, so that the 5G NR system supports reporting of the plurality of BLERs, to meet a requirement for supporting a URLLC service.

This application provides a channel state information report transmission method and a communications device. The method includes: determining N channel state information reports; and sending M of the N channel state information reports based on priorities of the N channel state information reports, where both N and M are positive integers greater than or equal to 1, and M is less than or equal to N; and the priority of the channel state information report is determined based on a priority of a block error rate (BLER) corresponding to the channel state information report. In the 5G NR mobile communications system, some services such as a URLLC service may support two BLERs. In other words, the at least one channel state information report may correspond to two BLERs. Even in 5G NR or a future mobile communications system, one channel state information report may correspond to more BLERs. In this application, when transmitting the channel state information report, the communications apparatus considers the priority of the BLER, to adapt to the requirement of the 5G NR system, so as to improve reliability of the mobile communications system.

DETAILED DESCRIPTION OF ILLUSTRATIVE EMBODIMENTS

In a long term evolution (LTE) system, a terminal device transmits a periodic channel state information report through a physical uplink control channel (PUCCH), but a capacity of the PUCCH is limited. It should be noted that a prior-art channel state information report is CSI. When the capacity is limited, the system uses a drop criterion. To be specific, the terminal device transmits CSI based on a priority of each piece of CSI, and the terminal device may transmit CSI with a higher priority, and drop CSI with a lower priority. A priority of CSI is determined based on a channel quality indicator (CQI) report type, a CSI process identifier, a cell identity, and a subframe set index. The CQI report type is also referred to as a CSI report type. The CSI process identifier is an identifier of a process used to transmit the CSI. The cell identity is an identity of a cell to which the terminal device belongs. The subframe set index is an index of a subframe set corresponding to the CSI. However, in the LTE system, the CSI corresponds to only one BLER.

In a 5G NR mobile communications system, some services such as a URLLC service may support two BLERs. In other words, one channel state information report may correspond to two BLERs. In 5G NR or a future mobile communications system, one channel state information report may even correspond to more BLERs. It should be noted that the channel state information report includes at least one piece of CSI. Therefore, if only the drop (Drop) criterion in the LTE system is considered in the 5G NR system, in other words, the BLER corresponding to the channel state information report is not considered, reliability of the 5G NR system is relatively low.

Figure 1:
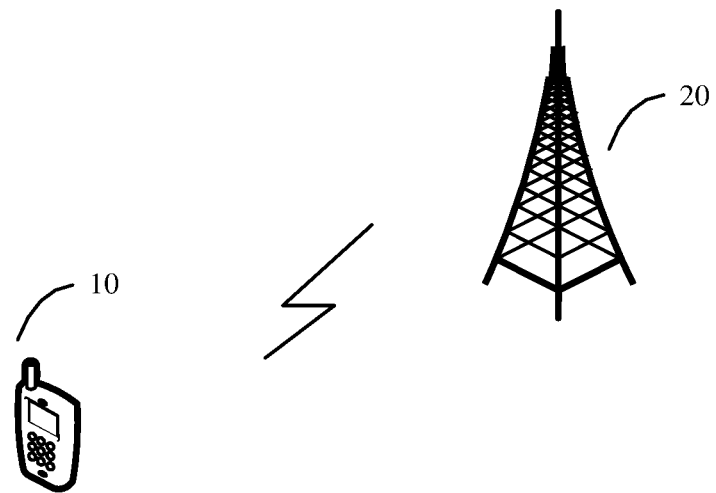
FIG. 1 is a schematic diagram of an application scenario according to an embodiment of this application.

To resolve the foregoing technical problem, this application provides a channel state information report transmission method and a communications device. Specifically, FIG. 1 is a schematic diagram of an application scenario according to an embodiment of this application. The technical solutions provided in this application are based on the application scenario shown in FIG. 1. The application scenario includes at least one communications apparatus 10, and the communications apparatus 10 communicates with a network device 20 through a wireless interface. For clarity, FIG. 1 shows only one communications apparatus and one network device.

The communications apparatus in this application may be a terminal device or a storage medium, for example, a chip. The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (ST) in a wireless local area network (WLAN), or may be a cellular phone, a cordless phone, a session initiation protocol (SIP) phone, a wireless local loop (WLL), a station, a personal digital assistant (PDA) device, a handheld device with a wireless communication function, a computing device, or another processing device connected to a wireless modem, a vehicle-mounted device, a wearable device, and a next-generation communications system, for example, a terminal device in a 5th generation (fifth-generation, 5G) communications network, a terminal device in a future evolved public land mobile network (PLMN), or a terminal device in a new radio (NR) communications system. A specific structure of the communications apparatus is not limited in this application, provided that the communications apparatus can perform a corresponding method provided in this application.

The network device in this application may be a device configured to communicate with the foregoing communications apparatus. The network device may be an access point (AP) in a WLAN or a base transceiver station (BTS) in GSM or CDMA, may be a NodeB (NB) in WCDMA, or may be an evolved NodeB (eNB or eNodeB) in LTE, a relay station or an access point, a vehicle-mounted device, a wearable device and a network device in a future 5G network, a network device in a future evolved PLMN, a new generation NodeB (gNodeB) in an NR system, or the like. A specific structure of the network device is not limited in this application, provided that the network device can perform a corresponding method provided in this application.

The technical solutions provided in this application may be applied to the following communications systems, for example, a global system for mobile communications (GSM), a code division multiple access (CDMA) system, a wideband code division multiple access (WCDMA) system, a general packet radio service (GPRS) system, and a universal mobile telecommunications system (UMTS), and in particular, to an LTE system, an LTE-Advanced system, and a 5G NR wireless communications system.

The communications apparatus or the network device in this application includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may include any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant messaging software.

Based on the foregoing application scenario, the following specifically describes a channel state information report transmission method and a communications device that are provided in this application.

Figure 2:
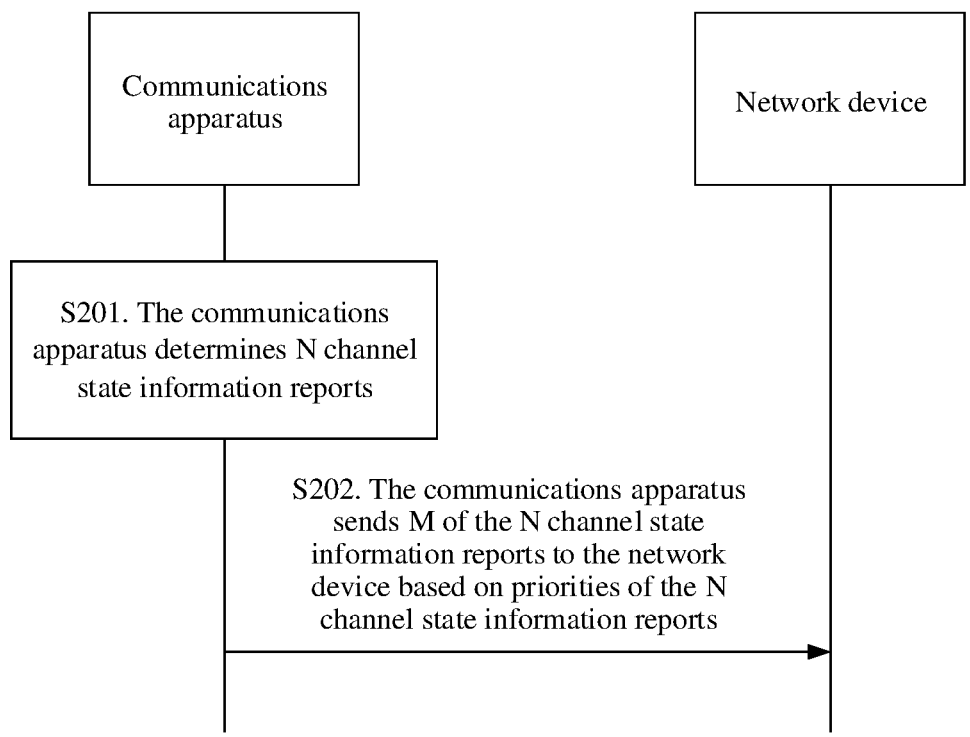
FIG. 2 is an interaction flowchart of a channel state information report transmission method according to an embodiment of this application.

FIG. 2 is an interaction flowchart of a channel state information report transmission method according to an embodiment of this application. As shown in FIG. 2, the method includes the following steps.

Step S201: A communications apparatus determines N channel state information reports.

Step S202: The communications apparatus sends M of the N channel state information reports to a network device based on priorities of the N channel state information reports, where both N and M are positive integers greater than or equal to 1, and M is less than or equal to N; and the priority of the channel state information report is determined based on a priority of a block error rate (BLER) corresponding to the channel state information report.

Specifically, the channel state information report may include at least one piece of CSI. Usually, when the channel state information report corresponds to one BLER, the channel state information report is one piece of CSI. When the channel state information report corresponds to P BLERs, the channel state information report includes P pieces of CSI, where P is a positive integer greater than or equal to 2. It should be noted that the CSI in this application may be CSI in an LTE system or a 5G NR system, or may be type-1 CSI or type-2 CSI in the 5G NR system, or may be periodic CSI or aperiodic CSI. Specifically, the CSI may include one or a combination of more of a CQI, a precoding matrix indicator (PMI), a channel state information-reference signal resource indicator (CRI), and information about a measurement link configuration set. The CSI may alternatively be information having a similar function to the CSI. The information having the similar function to the CSI means that the information is used to indicate or measure channel state information.

In this application, uplink channels used to transmit a channel state information report are collectively referred to as an uplink channel. The uplink channel may be a PUCCH, or may be an physical uplink shared channel (PUSCH). Because a capacity of the uplink channel is limited, to send an important channel state information report, in this application, the terminal device may send the channel state information report based on priorities of channel state information reports.

The priority of the channel state information report is determined based on the priority of the BLER corresponding to the channel state information report.

Optional manner 1: The priority of the channel state information report includes the priority of the BLER corresponding to the channel state information report.

Optionally, the priority of the channel state information report may further include at least one of the following: a priority of a channel state information report type, a priority of a configuration measurement set, a priority of a cell identity, a priority of a time domain resource set, and the like. The priority of the time domain resource set may be at least one of the following: a priority of a slot resource set, a priority of a mini-slot resource set, and a priority of a subframe resource set. The N channel state information reports may be sent in a sequence of the priorities.

The channel state information report type may include a channel state information report type including a subband and a channel state information report type including a wideband.

Alternatively, the channel state information report type may include a channel state information report of type-1 CSI and a channel state information report of type-2 CSI.

It should be noted that the channel state information report type is not limited in this application.

The priority of the BLER may be determined based on a specific value of the BLER. For example, if a first BLER is greater than a second BLER, it is determined that a priority of the second BLER is higher than a priority of the first BLER. Certainly, the priority of the BLER may also be described as a relative relationship between different BLERs.

The priority of the configuration measurement set may be at least one of the following: a priority of a measurement link configuration (RIMeasLinkConfig), a priority of a channel state information-reference signal (CSI-RS), and a priority of channel state information-interference measurement (CSI-IM). When the priority of the configuration measurement set includes a plurality of priorities, the priority of the configuration measurement set may be determined based on one of the priorities. If the priority of the configuration measurement set cannot be determined based on this priority, the priority of the configuration measurement set may continue to be determined based on another priority until the priority of the configuration measurement set is determined. When the priority of the configuration measurement set includes the priority of the CSI-RS and the priority of the CSI-IM, the priority of the configuration measurement set may be first determined based on the CSI-RS. If the priority of the configuration measurement set cannot be determined based on the CSI-RS, the priority of the configuration measurement set is determined based on the CSI-IM.

The priority of the cell identity may be determined based on a cell identity index number. For example, a smaller cell identity index number correspondingly indicates a higher priority.

The priority of the time domain resource set may be determined based on a time domain resource set index number. For example, a smaller time domain resource set index number correspondingly indicates a higher priority.

A concept of a slot is defined in a 5G system. One slot may be used to transmit 14 symbols, and the 14 symbols may include a downlink symbol used to transmit downlink data, an unknown symbol, and an uplink symbol used to transmit uplink data. A mini-slot may be used to transmit 1 to 13 symbols. One slot or mini-slot may correspond to different subcarrier spacings, for example, a slot with a subcarrier spacing of 15 kilohertz (kHz) and a subcarrier spacing of 60 kHz.

For example, a sequence of the priorities included in the priority of the channel state information report may be denoted as follows: the priority of the BLER corresponding to the channel state information report>the priority of the channel state information report type>the priority of the configuration measurement set>the priority of the cell identity>the priority of the time domain resource set. ">" indicates that "the priority is higher than". It should be noted that the foregoing priorities may not coexist. For example, only the priority of the channel state information report type and the priority of the BLER corresponding to the channel state information report exist. A sequence of the foregoing priorities and the priorities included in the priority of the channel state information report are not limited in this application.

It is assumed that there are the N channel state information reports: a channel state information report 1, a channel state information report 2, . . . , and a channel state information report N. The communications apparatus first sends the N channel state information reports based on priorities of BLERs. When BLERs corresponding to a plurality of the N channel state information reports have a same priority, the communications apparatus sends the plurality of channel state information reports based on priorities of CQI report types until all the N channel state information reports are sent.

Optional manner 2: The priority of the channel state information report type includes the priority of the BLER corresponding to the channel state information report, that is, the BLER is a channel state information report type. In an example, the priority of the channel state information report type>the priority of the configuration measurement set>the priority of the cell identity>the priority of the time domain resource set. It should be noted that the foregoing priorities may coexist or may not coexist. For example, only one to four of the foregoing priorities exist. For example, if only the priority of the channel state information report type and the priority of the cell identity exist, the priority of the channel state information report type>the priority of the cell identity. ">" indicates that "the priority is higher than". A sequence of the foregoing priorities and the priorities included in the priority of the channel state information report are not limited in this application.

Optional manner 3: The communications apparatus may calculate the priority of the channel state information report by using a function, where an input parameter of the function includes the priority of the BLER corresponding to the channel state information report. Optionally, the priority of the channel state information report further includes at least one of the following: the priority of the channel state information report type, the priority of the configuration measurement set, the priority of the cell identity, and the priority of the time domain resource set. An output parameter of the function is the priority of the channel state information report.

For example, the function is: $F=w1 \times A1+w2 \times A2+w3 \times A3+w4 \times A4+w5 \times A5$.

Herein, w1, w2, w3, w4, and w5 respectively represent a weight coefficient of the priority of the BLER corresponding to the channel state information report, a weight coefficient of the priority of the channel state information report type, a weight coefficient of the priority of the configuration measurement set, a weight coefficient of the priority of the cell identity, and a weight coefficient of the priority of the time domain resource set. A1, A2, A3, A4, and A5 respectively represent the priority of the BLER corresponding to the channel state information report, the priority of the channel state information report type, the priority of the configuration measurement set, the priority of the cell identity, and the priority of the time domain resource set. "×" indicates "multiplication", and "+" indicates "addition". It should be noted that the foregoing priorities may coexist or may not coexist. For example, only one to four of the foregoing priorities exist. For example, w1+w2+w3+w4+w5=1. For another example, w1+w2+w3+w4+w5 may be greater than 1. A value of w1 is related to the priority of the BLER. In other words, the value of w1 is determined based on the priority of the BLER.

Optional manner 4: The communications apparatus may calculate the priority of the channel state information report by using a function, where an input parameter of the function includes at least one of the following: the priority of the channel state information report type, the priority of the configuration measurement set, the priority of the cell identity, and the priority of the time domain resource set. The priority of the channel state information report type includes the priority of the BLER corresponding to the channel state information report. An output parameter of the function is the priority of the channel state information report.

For example, the function is: $F=w2 \times A2+w3 \times A3+w4 \times A4+w5 \times A5$. A value of w2 is related to the priority of the BLER. In other words, the value of w1 is determined based on the priority of the BLER. Meanings of other coefficients are the same as those described above. Details are not described herein again.

It should be noted that how to determine the priority of the channel state information report based on the priority of the block error rate (BLER) corresponding to the channel state information report is not limited in this application.

In conclusion, in the 5G NR mobile communications system, some services such as a URLLC service may support two BLERs. In other words, at least one channel state information report may correspond to two BLERs. Even in 5G NR or a future mobile communications system, one channel state information report may correspond to more BLERs. In this application, when transmitting the channel state information report, the communications apparatus considers the priority of the BLER, to adapt to a requirement of the 5G NR system, so as to improve reliability of the mobile communications system.

Further, the priority of the BLER is predefined; or the priority of the BLER is determined based on higher layer signaling; or the priority of the BLER is determined based on downlink control information (DCI).

That "the priority of the BLER is predefined" means that the priority of the BLER has been written into a communications protocol in advance.

The higher layer signaling may be one of the following: radio resource control (RRC) signaling or media access control (MAC) signaling, minimum system information (MSI) signaling, or remaining minimum system information (RMSI) signaling, other system information (OSI) signaling, and the like.

That "the priority of the BLER is determined based on higher layer signaling" means that the higher layer signaling includes the priority of the BLER, or the priority of the BLER is determined based on a format, a type, or the like of the higher layer signaling. An example in which the priority of the BLER is determined based on the type of the higher layer signaling is used. For example, the RRC signaling corresponds to a priority 1, the MAC CE signaling corresponds to a priority 2, the MSI signaling corresponds to a priority 3, and the RMSI signaling corresponds to a priority 4. It should be noted that the priorities 1 to 4 herein may represent a sequence of the priorities from low to high, or may represent a sequence of the priorities from high to low. It should be noted that the foregoing priorities may coexist or may not coexist. For example, only one to three of the foregoing priorities exist. This is not limited in this application.

That "the priority of the BLER is determined based on downlink control information (DCI)" means that the DCI includes indication information of the priority of the BLER, or the priority of the BLER is determined based on a format, a type, or the like of the DCI.

In this application, the communications apparatus can effectively determine the priority of the BLER in the foregoing three methods, can determine the priority of the channel state information report based on the priority of the BLER, and send the channel state information report based on the priority, to improve system reliability.

Further, optionally, a quantity of bits of the N channel state information reports is greater than a maximum quantity of carried bits on an uplink channel; a quantity of bits of the M channel state information reports is less than or equal to the maximum quantity of carried bits; and the uplink channel is used to transmit the M channel state information reports. Further, optionally, a quantity of bits of M+1 channel state information reports is greater than the maximum quantity of carried bits on the uplink channel, and M+1 is less than or equal to N.

Optionally, a sum of a quantity of bits of the N channel state information reports and a quantity of bits of at least one piece of information is greater than a maximum quantity of carried bits on an uplink channel; a sum of a quantity of bits of the M channel state information reports and the quantity of bits of the at least one piece of information is less than or equal to the maximum quantity of carried bits; and the uplink channel is used to transmit the M channel state information reports and the at least one piece of information. The at least one piece of information includes at least one of the following: hybrid automatic repeat request (HARQ) information and scheduling request (SR) information. Further, optionally, a sum of a quantity of bits of M+1 channel state information reports and the quantity of bits of the at least one piece of information is greater than the maximum quantity of carried bits on the uplink channel, and M+1<=N.

The maximum quantity of carried bits is determined based on at least one of the following: a maximum bit rate that the uplink channel can support for carrying information, a time domain resource occupied by the uplink channel, a frequency domain resource occupied by the uplink channel, and a format of the uplink channel.

"Information" in the "maximum bit rate that the uplink channel can support for carrying information" includes data and/or control information.

The following describes a method in which a communications apparatus determines a BLER corresponding to a channel state information report. The method specifically includes the following manners.

Figure 3:
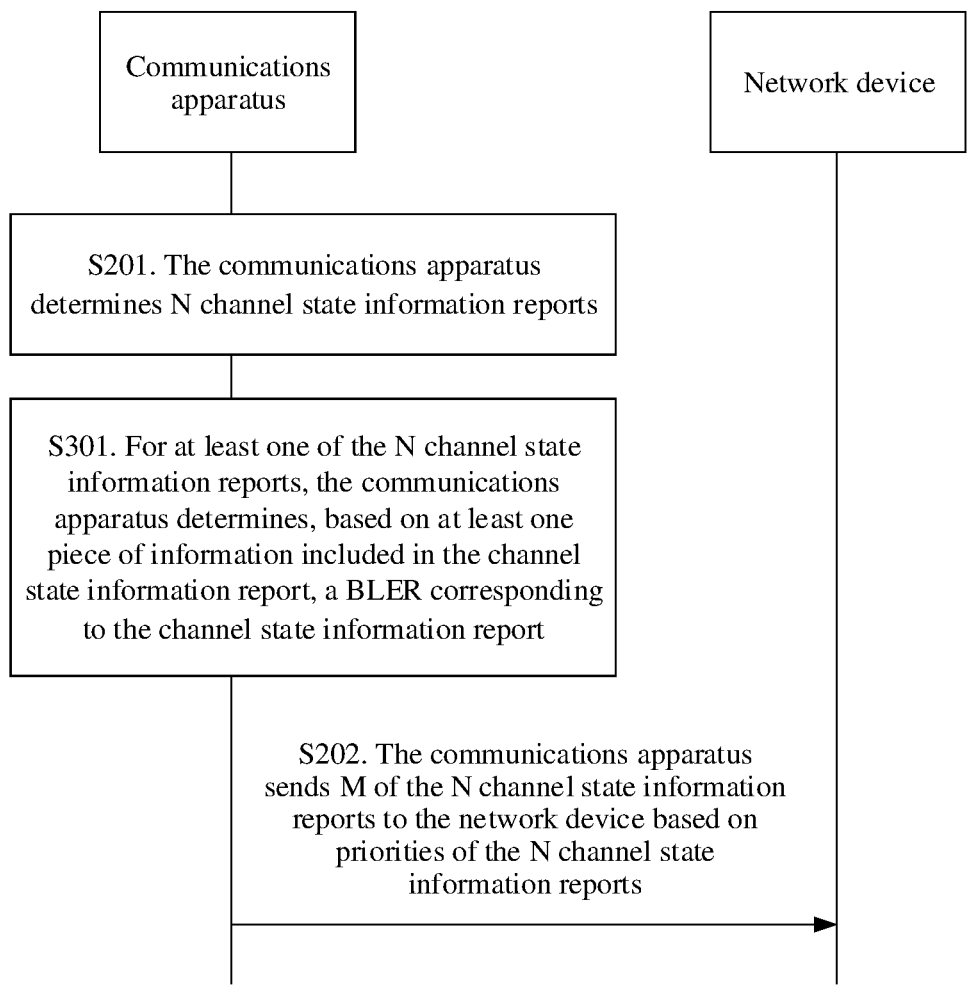
FIG. 3 is an interaction flowchart of a channel state information report transmission method according to another embodiment of this application.

Optional manner 1: FIG. 3 is an interaction flowchart of a channel state information report transmission method according to another embodiment of this application. As shown in FIG. 3, before step S202, the method further includes the following steps.

Step S301: For at least one of the N channel state information reports, the communications apparatus determines, based on at least one piece of information included in a channel state information report, a BLER corresponding to the channel state information report.

The channel state information report in the sentence "the communications apparatus determines, based on at least one piece of information included in a channel state information report, a BLER corresponding to the channel state information report" is any one of "the at least one channel state information report".

The at least one piece of information included in the channel state information report may include at least one of the following: a CQI, a PMI, an RI, a CRI, and information about a measurement link configuration set. An example in which the BLER corresponding to the channel state information report is determined based on the CQI is used. When the channel state information report includes the CQI, and the CQI falls within a preset range, it is determined that the BLER corresponding to the channel state information report is a first BLER; or when the CQI does not fall within a preset range, it is determined that the BLER corresponding to the channel state information report is a second BLER. Alternatively, when the channel state information report includes the CQI, and the CQI falls within a preset range, it is determined that the BLERs corresponding to the channel state information reports are a first BLER and a second BLER; or when the CQI does not fall within a preset range, it is determined that the BLER corresponding to the channel state information report is a first BLER. Alternatively, when the channel state information report includes the CQI, and the CQI is a CQI in a table at a first BLER, it is determined that the BLER corresponding to the channel state information report is the first BLER. When the channel state information report includes the CQI, and the CQI is a CQI in a table at a second BLER, it is determined that the BLERs corresponding to the channel state information reports are a first BLER and the second BLER.

An example in which the BLER corresponding to the channel state information report is determined based on the CRI is used. When the channel state information report includes the CRI, and the CRI indicates that a resource is in a preset resource set, it is determined that the BLER corresponding to the channel state information report is a first BLER; or when the CRI indicates that a resource is not in a preset resource set, it is determined that the BLER corresponding to the channel state information report is a second BLER. Alternatively, when the channel state information report includes the CRI, and the CRI indicates that a resource is in a preset resource set, it is determined that the BLERs corresponding to the channel state information reports are a first BLER and a second BLER; or when the CRI indicates that a resource is not in a preset resource set, it is determined that the BLER corresponding to the channel state information report is a first BLER. Alternatively, when the channel state information report includes the CRI, and a resource indicated by the CRI is a resource corresponding to a first BLER, it is determined that the BLER corresponding to the channel state information report is the first BLER. When the channel state information report includes the CRI, and a resource indicated by the CRI is a resource corresponding to a second BLER, it is determined that the BLERs corresponding to the channel state information reports are a first BLER and the second BLER.

An example in which the BLER corresponding to the channel state information report is determined based on the PMI is used. When the channel state information report includes the PMI, and the PMI falls within a preset range, it is determined that the BLER corresponding to the channel state information report is a first BLER; or when the PMI does not fall within a preset range, it is determined that the BLER corresponding to the channel state information report is a second BLER. Alternatively, when the PMI falls within a preset range, it is determined that the BLERs corresponding to the channel state information reports are a first BLER and a second BLER; or when the PMI does not fall within a preset range, it is determined that the BLER corresponding to the channel state information report is a first BLER. Alternatively, when the channel state information report includes the PMI, and the PMI is a PMI in a table at a first BLER, it is determined that the BLER corresponding to the channel state information report is the first BLER. When the channel state information report includes the PMI, and the PMI is a PMI in a table at a second BLER, it is determined that the BLERs corresponding to the channel state information reports are a first BLER and the second BLER.

It should be noted that specific values of the first BLER and the second BLER are not limited in this application. For example, the first BLER is 10e-3, and the second BLER is 10e-5. For another example, the first BLER is one or more of 10e-1, 10e-2, 10e-3, and 10e-4, and the second BLER is 10e-5.

How to determine, based on the at least one piece of information included in the channel state information report, the BLER corresponding to the channel state information report is not limited in this application.

Figure 4:
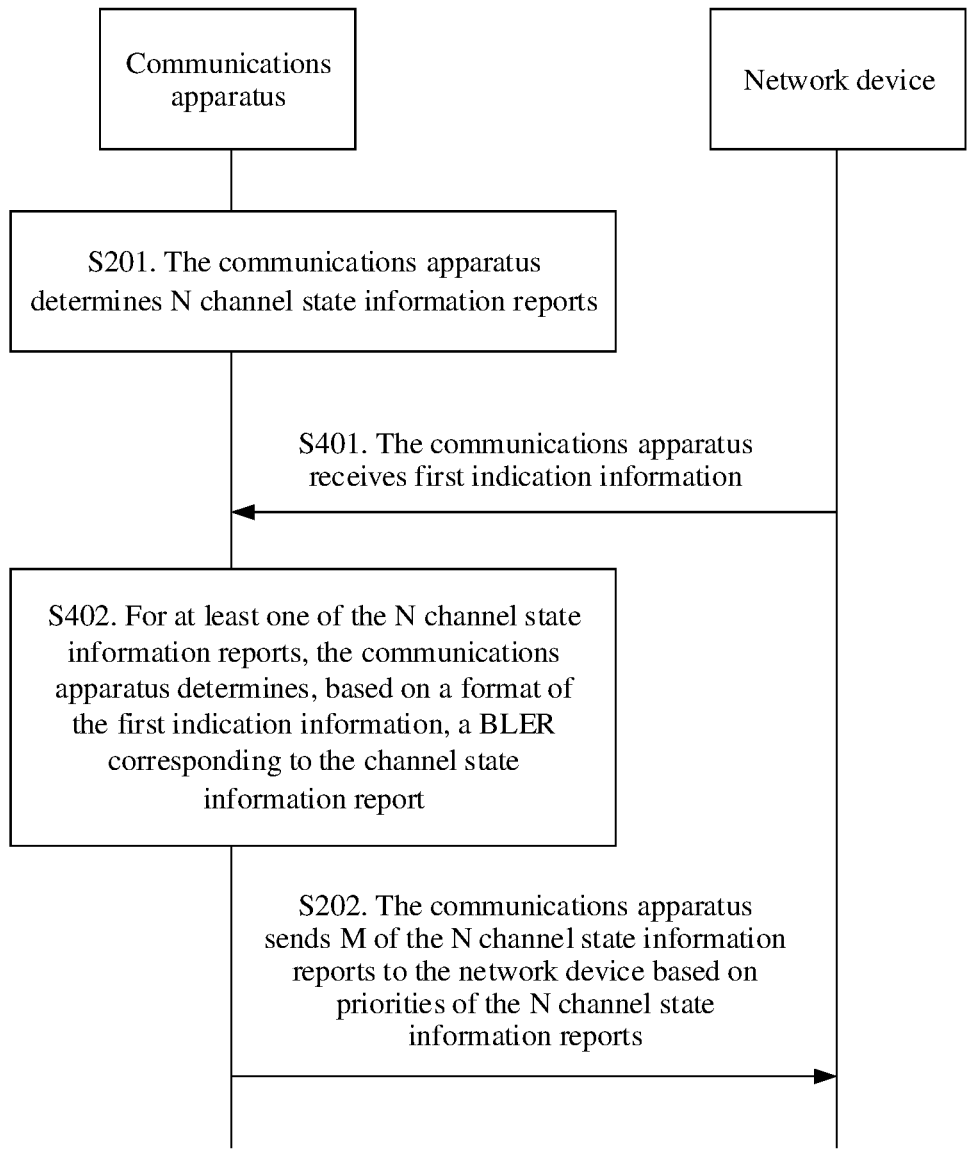
FIG. 4 is an interaction flowchart of a channel state information report transmission method according to still another embodiment of this application.

Optional manner 2: FIG. 4 is an interaction flowchart of a channel state information report transmission method according to still another embodiment of this application. As shown in FIG. 4, before step S202, the method further includes the following steps:

Step S401: The communications apparatus receives first indication information.

Step S402: For at least one of the N channel state information reports, the communications apparatus determines, based on a format of the first indication information, a BLER corresponding to the channel state information report.

The channel state information report in that "the communications apparatus determines, based on the format of the first indication information, the BLER corresponding to the channel state information report" is any one of "the at least one channel state information report".

Optionally, the first indication information is directly used to indicate the BLER corresponding to the channel state information report. For example, the first indication information indicates that the BLER corresponding to the channel state information report is a first BLER, and the first BLER is one or more of $10e{-}1$, $10e{-}2$, $10e{-}3$, $10e{-}4$, and $10e{-}5$.

Optionally, the BLER corresponding to the channel state information report may be determined by using the format of the first indication information. For example, when the format of the first indication information is a format 1, it is determined that the BLER corresponding to the channel state information report is a first BLER. When the format of the first indication information is a format 2, it is determined that the BLER corresponding to the channel state information report is a second BLER. A specific format of the first indication information is not limited in this application. For example, the first indication information is downlink control information (DCI), and the format of the first indication information is a DCI format. For example, the first BLER is $10e{-}3$, and the second BLER is $10e{-}5$. For another example, the first BLER is one or more of $10e{-}1$, $10e{-}2$, $10e{-}3$, and $10e{-}4$, and the second BLER is $10e{-}5$.

Figure 5:
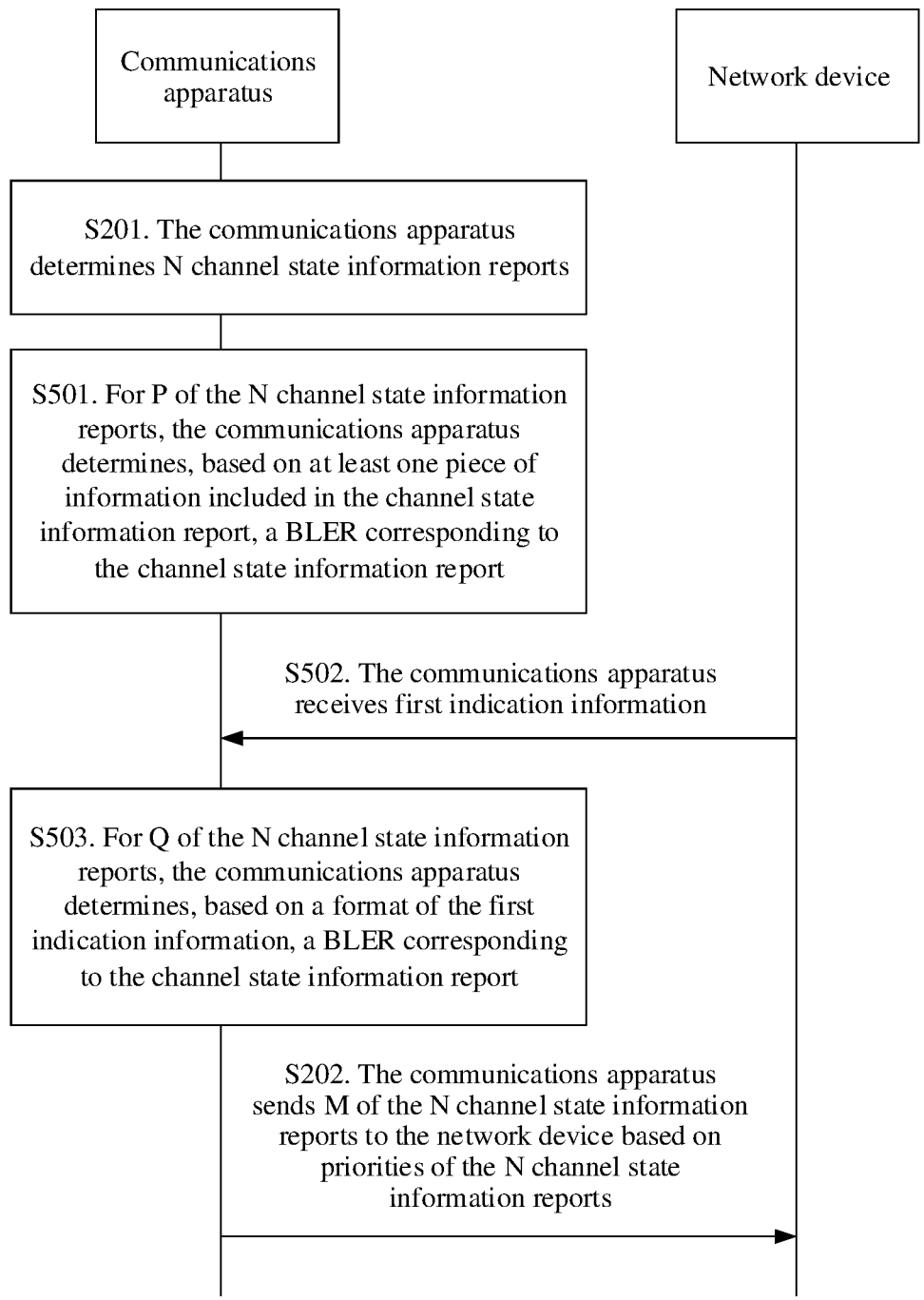
FIG. 5 is an interaction flowchart of a channel state information report transmission method according to an embodiment of this application.

Optional manner 3: With reference to the optional manner 1 and the optional manner 2, specifically, FIG. 5 is an interaction flowchart of a channel state information report transmission method according to an embodiment of this application. As shown in FIG. 5, before step S202, the method further includes the following steps.

Step S501: For P of the N channel state information reports, the communications apparatus determines, based on at least one piece of information included in the channel state information report, a BLER corresponding to the channel state information report.

Step S502: The communications apparatus receives first indication information.

Step S503: For Q of the N channel state information reports, the communications apparatus determines, based on a format of the first indication information, a BLER corresponding to the channel state information report.

A sum of P and Q is less than or equal to N. To be specific, the communications apparatus first determines the BLER corresponding to each of the P channel state information reports in the N channel state information reports in the foregoing optional manner 1, and then determines the BLER corresponding to each of the Q channel state information reports in the N channel state information reports in the foregoing optional manner 2.

Figure 6:
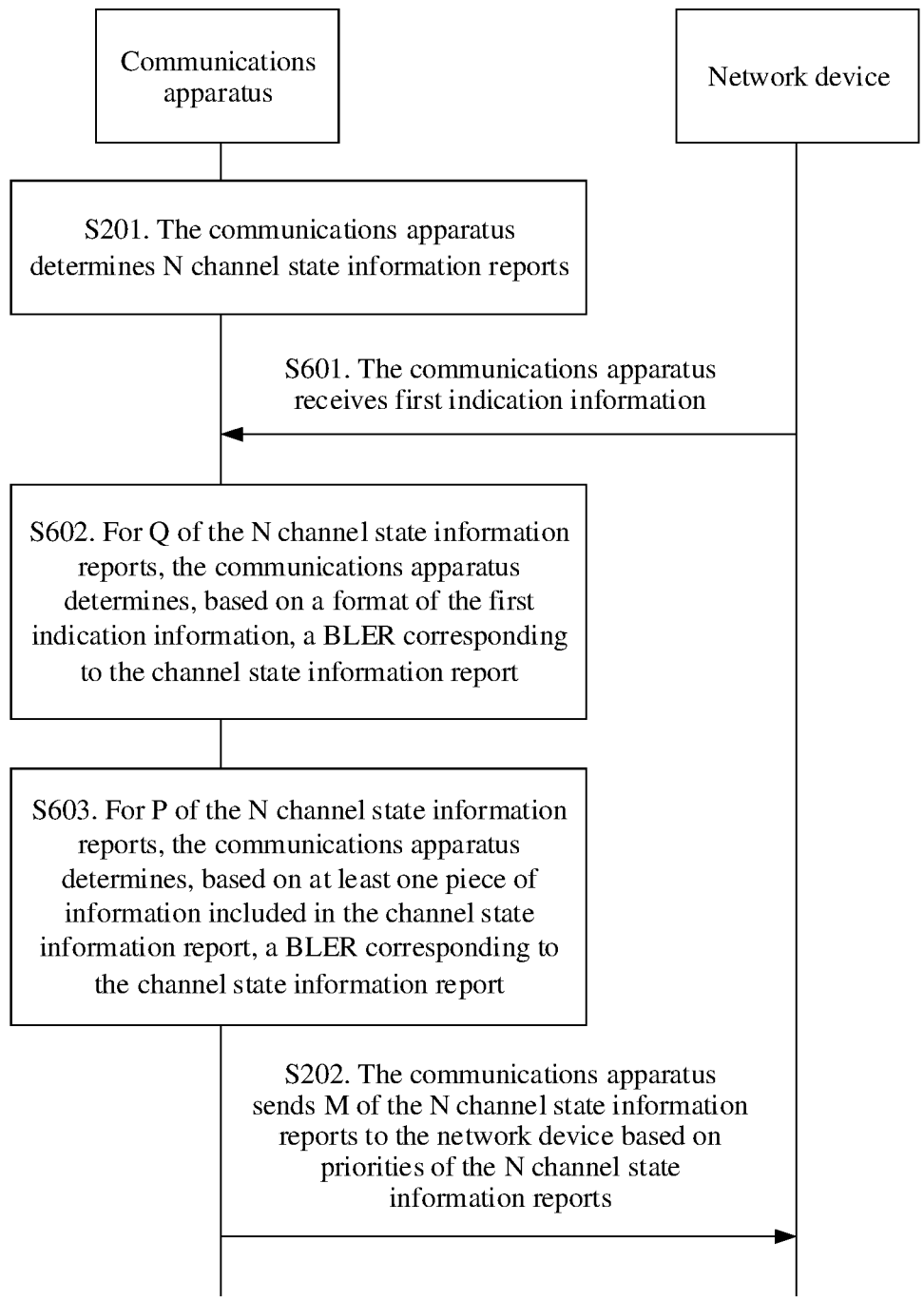
FIG. 6 is an interaction flowchart of a channel state information report transmission method according to an embodiment of this application.

Optional manner 4: With reference to the optional manner 1 and the optional manner 2, specifically, FIG. 6 is an interaction flowchart of a channel state information report transmission method according to an embodiment of this application. As shown in FIG. 6, before step S202, the method further includes the following steps:

Step S601: The communications apparatus receives first indication information.

Step S602: For Q of the N channel state information reports, the communications apparatus determines, based on a format of the first indication information, a BLER corresponding to the channel state information report.

Step S603: For P of the N channel state information reports, the communications apparatus determines, based on at least one piece of information included in the channel state information report, a BLER corresponding to the channel state information report.

A sum of P and Q is less than or equal to N. To be specific, the communications apparatus determines the BLER corresponding to each of the P channel state information reports in the N channel state information reports in the foregoing optional manner 2, and determines the BLER corresponding to each of the Q channel state information reports in the N channel state information reports in the foregoing optional manner 1. It should be noted that step S602 and step S603 are not limited in terms of time. To be specific, step S602 and step S603 may be performed at the same time or step 602 may be performed before or after step S603.

In this application, the communications apparatus can effectively determine, in the optional manner 1, the optional manner 2, the optional manner 3, or the optional manner 4, the BLER corresponding to the channel state information report.

Figure 7:
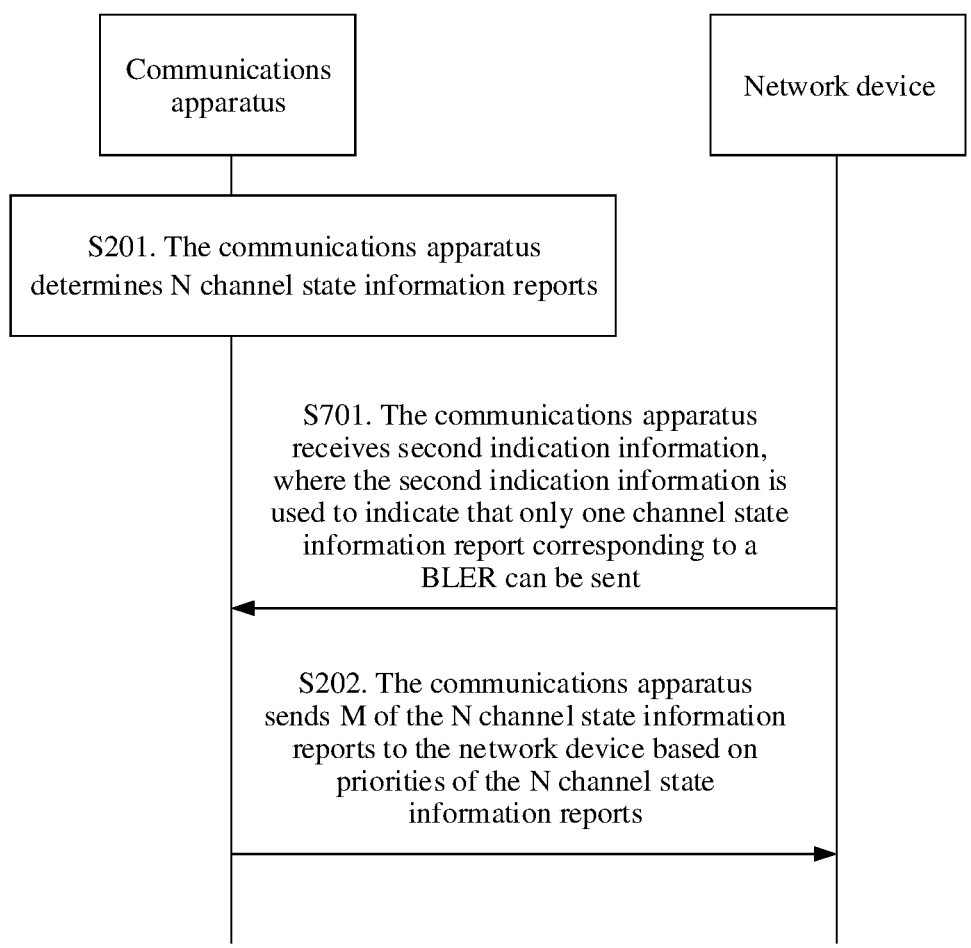
FIG. 7 is an interaction flowchart of a channel state information report transmission method according to yet another embodiment of this application.

Further, FIG. 7 is an interaction flowchart of a channel state information report transmission method according to yet another embodiment of this application. As shown in FIG. 7, before step S202, the method further includes the following steps:

Step S701: The communications apparatus receives second indication information, where the second indication information is used to indicate that only a channel state information report corresponding to one BLER can be sent.

The second indication information is higher layer signaling or downlink control information (DCI). The higher layer signaling may be RRC signaling, MAC signaling, MSI signaling, RMSI signaling, OSI signaling, or the like.

Based on step S701, in step S202, the communications apparatus can send only a channel state information report corresponding to one BLER. For example, the communications apparatus can send only a channel state information report whose BLER is a first BLER, or the communications apparatus can send only a channel state information report whose BLER is a second BLER.

It should be noted that the embodiments corresponding to FIG. 7 and FIG. 3 may be combined. In this case, step S701 may be performed before or after step S301, provided that step S701 is performed before step S201. This is not limited in this application. Similarly, the embodiments corresponding to FIG. 7 and FIG. 4 may be combined. In this case, step S701 may be performed before step S401, or may be performed between step S401 and step S402, or may be performed after step S402, provided that step S701 is performed before step S201. This is not limited in this application. Similarly, the embodiments corresponding to FIG. 7 and FIG. 5 or FIG. 6 may be combined. A combination manner is similar to the foregoing combination manner. Details are not described in this application again.

Figure 8:
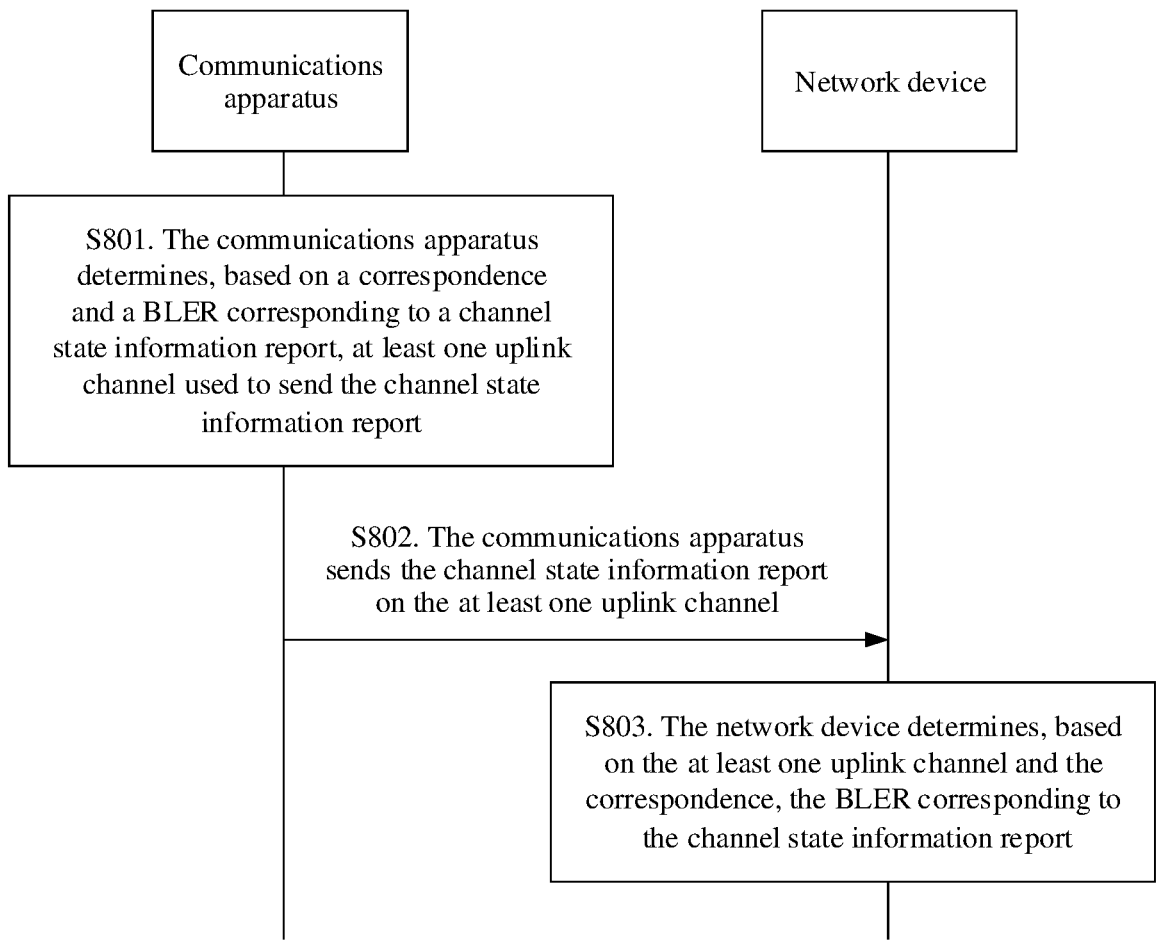
FIG. 8 is an interaction flowchart of a channel state information report transmission method according to an embodiment of this application.

FIG. 8 is an interaction flowchart of a channel state information report transmission method according to an embodiment of this application. As shown in FIG. 8, the method includes the following steps:

Step S801: A communications apparatus determines, based on a correspondence and a BLER corresponding to a channel state information report, at least one uplink channel used to send the channel state information report, where the correspondence includes a correspondence between the block error rate (BLER) and the at least one uplink channel.

Step S802: The communications apparatus sends the channel state information report on the at least one uplink channel.

Step S803. A network device determines, based on the at least one uplink channel and the correspondence, the BLER corresponding to the channel state information report, where the correspondence includes the correspondence between the block error rate (BLER) and the at least one uplink channel.

Step S801 is described as follows: For clarity, the correspondence in that "the communications apparatus determines the at least one uplink channel based on the correspondence and the BLER corresponding to the channel state information report" may be referred to as a first correspondence, and the correspondence between the block error rate (BLER) and the at least one uplink channel is referred to as a second correspondence. The first correspondence may be shown in Table 1.

TABLE 1

| BLER | Uplink channel |
|---|---|
| First BLER | Uplink channel 2 |
| Second BLER | Uplink channel 1 and uplink channel 2 |

TABLE 2

| BLER | Uplink channel |
|---|---|
| First BLER | Uplink channel 1 |
| Second BLER | Uplink channel 1 and uplink channel 2 |

If a BLER corresponding to a current channel state information report is the second BLER, the communications apparatus determines, based on the correspondence and the BLER corresponding to the channel state information report, that the uplink channels used to send the channel state information report are the uplink channel 1 and the uplink channel 2.

TABLE 3

| BLER | Uplink channel |
|---|---|
| First BLER | Uplink channel 1 |
| Second BLER | Uplink channel 2 |

TABLE 4

| BLER | Uplink channel |
|---|---|
| First BLER | Uplink channel 1 |
| Second BLER | Uplink channel 2 |
| Third BLER | Uplink channel 3 |

It should be noted that Table 1 to Table 4 may be independent tables, or may be a part of a large table.

It should be noted that specific values of the first BLER, the second BLER, and the third BLER are not limited in this application. For another example, the first BLER is one or more of 10e-1, 10e-2, 10e-3, 10e-4, 10e-5, and 10e-6, the second BLER is one or more of 10e-1, 10e-2, 10e-3, 10e-4, 10e-5, and 10e-6, and the third BLER is one or more of 10e-1, 10e-2, 10e-3, 10e-4, 10e-5, and 10e-6. For example, the first BLER is 10e-3, and the second BLER is 10e-5.

It should be noted that the at least one uplink channel may also be referred to as an uplink channel set.

Optionally, the first correspondence is predefined; or the first correspondence is determined based on higher layer signaling; or the first correspondence is determined based on downlink control information (DCI).

That "the first correspondence is predefined" means that the first correspondence has been written into a communications protocol in advance.

The higher layer signaling may be RRC signaling, MAC signaling, MSI signaling, RMSI signaling, OSI signaling, or the like.

That "the first correspondence is determined based on higher layer signaling" means that the higher layer signaling includes the first correspondence, or the first correspondence is determined by using a format, a type, or the like of the higher layer signaling.

That "the first correspondence is determined based on downlink control information (DCI)" means that the DCI includes indication information of the first correspondence, or the first correspondence is determined based on a format, a type, or the like of the DCI.

In this application, the communications apparatus can effectively determine the first correspondence in the foregoing three methods, can determine, based on the first correspondence, the uplink channel corresponding to the channel state information report, and send the channel state information report on the uplink channel, to improve system reliability.

Step S801 includes the following optional manners.

Optional manner 1: The BLER corresponding to the channel state information report includes a first BLER and a second BLER, and the at least one uplink channel includes a first uplink channel corresponding to the first BLER and a second uplink channel corresponding to the second BLER.

The first uplink channel is an uplink channel configured for HARQ information, or an uplink channel predefined for HARQ information, or an uplink channel that is for HARQ information and that is determined by the communications apparatus by using the DCI. There may be one or more first uplink channels corresponding to the first BLER. It should be understood that the uplink channel that is for the HARQ information and that is determined by the communications apparatus by using the DCI is an uplink channel for indicating the HARQ information by using an uplink channel indicator field in the DCI.

It should be noted that in this application, optionally, "configured" means "configured by using the higher layer signaling". Details are not described below.

Optionally, the first uplink channel may alternatively be an uplink channel configured for scheduling request (SR) information, or an uplink channel predefined for SR information, or an uplink channel that is for SR information and that is determined by the communications apparatus by using the DCI. There may be one or more first uplink channels corresponding to the first BLER. It should be understood that the uplink channel that is for the SR information and that is determined by the communications apparatus by using the DCI is an uplink channel for indicating the SR information by using an uplink channel indicator field in the DCI.

It should be noted that during transmission of the channel state information report corresponding to the first BLER, the first uplink channel may be used to transmit the HARQ information, or may not be used to transmit the HARQ information. This depends on whether the communications apparatus feeds back the HARQ information.

The second uplink channel is an uplink channel configured only for the channel state information report, or an uplink channel predefined only for the channel state information report, or an uplink channel that is for the channel state information report and that is determined by the communications apparatus by using the DCI. There may be one or more second uplink channels corresponding to the second BLER. It should be understood that the uplink channel that is for the channel state information report and that is determined by the communications apparatus by using the DCI is an uplink channel for indicating the channel state information report by using an uplink channel indicator field in the DCI.

That "the second uplink channel is an uplink channel configured only for the channel state information report, or an uplink channel predefined only for the channel state information report" means that the second uplink channel is a dedicated uplink channel used to transmit the channel state information report. It should be noted that the channel state information report herein transmitted on the second uplink channel is a general channel state information report, and a finally sent channel state information report is a specified channel state information report.

The optional manner 1 is used as an example for description. Assuming that the first BLER is 10e-3 and the second BLER is 10e-5, it may be determined, based on the first correspondence, that the first uplink channel corresponding to the first BLER is an uplink channel 1. Similarly, it may be determined, based on the second correspondence, that the second uplink channels corresponding to the second BLER are an uplink channel 1 and an uplink channel 2.

Optionally, a priority of the first BLER is lower than or equal to a priority of the second BLER. For example, the first BLER is 10e-3, and the second BLER is 10e-5.

Optionally, if the second BLER is less than the first BLER, in other words, a value of the second BLER is less than a value of the first BLER, a priority of the first BLER is higher than a priority of the second BLER. For example, the first BLER is 10e-3, and the second BLER is 10e-5. In this case, the priority of 10e-3 is higher than that of 10e-5.

In this application, the communications apparatus can generate the HARQ information only after demodulating data, and therefore, a delay of generating the HARQ information is relatively long. In addition, the uplink channel used to transmit the HARQ information may be further used to transmit the channel state information report. Therefore, once a load of the uplink channel used to transmit the HARQ information reaches a maximum quantity of carried bits, the HARQ information is more important, and consequently, a problem of dropping the channel state information report easily occurs. Based on this, in this application, a channel state information report with a relatively low priority is sent together with the HARQ information, to improve reliability of transmitting the channel state information report by a system.

Optionally, the optional manner further includes: receiving, by the communications apparatus, indication information, where the indication information includes first indication sub-information and second indication sub-information; the first indication sub-information is used to indicate the first uplink channel set; and the second indication sub-information is used to indicate the second uplink channel set. The first uplink channel set includes the first uplink channel. The first uplink channel set is an uplink channel set configured for HARQ information, or an uplink channel set predefined for HARQ information, or an uplink channel set that is for HARQ information and that is determined by the communications apparatus by using the DCI. The second uplink channel set includes the second uplink channel. The second uplink channel set is an uplink channel set configured only for the channel state information report, or an uplink channel set predefined only for the channel state information report, or an uplink channel set that is for the channel state information report and that is determined by the communications apparatus by using the DCI.

Optionally, the first uplink channel set may alternatively be an uplink channel set configured for SR information, or an uplink channel set predefined for SR information, or an uplink channel set that is for SR information and that is determined by the communications apparatus by using the DCI. It should be understood that the uplink channel set that is for the SR information and that is determined by the communications apparatus by using the DCI is an uplink channel set for indicating the SR information by using an uplink channel indicator field in the DCI. The first uplink channel set includes one or more uplink channels.

Optional manner 2: The block error rate (BLER) corresponding to the channel state information report includes a first BLER and a second BLER, and the at least one uplink channel is a same uplink channel corresponding to the first BLER and the second BLER.

Optionally, there may be one or more same uplink channels corresponding to the first BLER and the second BLER.

Optionally, the uplink channel is an uplink channel configured for HARQ information, or an uplink channel predefined for HARQ information, or an uplink channel that is for HARQ information and that is determined by the communications apparatus by using the DCI.

Optionally, the uplink channel is an uplink channel configured for SR information, or an uplink channel predefined for SR information, or an uplink channel that is for SR information and that is determined by the communications apparatus by using the DCI.

Optionally, the uplink channel is an uplink channel configured only for the channel state information report, or an uplink channel predefined only for the channel state information report, or an uplink channel that is for HARQ information and that is determined by the communications apparatus by using the DCI.

For example, assuming that the first BLER is 10e-3 and the second BLER is 10e-5, it may be determined, based on the first correspondence, that the first BLER and the second BLER correspond to an uplink channel 1.

Optional manner 3: The block error rate (BLER) corresponding to the channel state information report includes a first BLER or a second BLER. The at least one uplink channel includes a first uplink channel corresponding to the first BLER or a second uplink channel corresponding to the second BLER. Both the first uplink channel and the second uplink channel are uplink channels configured for hybrid automatic repeat (HARQ) information.

Optionally, both the first uplink channel and the second uplink channel are the uplink channels configured for the HARQ information, or uplink channels predefined only for the HARQ information, or uplink channels for the HARQ information that are determined by the communications apparatus by using the DCI.

Optional manner 4: The block error rate (BLER) corresponding to the channel state information report includes N BLERs, and N is a positive integer greater than or equal to 1. When N is equal to 1, the at least one uplink channel includes a first uplink channel corresponding to the N BLERs; or when N is greater than 1, the at least one uplink channel includes a second uplink channel corresponding to the N BLERs.

Optional manner 5: The BLER corresponding to the channel state information report includes a first BLER and a second BLER, and the at least one uplink channel includes a first uplink channel corresponding to the first BLER and a second uplink channel corresponding to the second BLER.

The first uplink channel may alternatively be an uplink channel configured for SR information, or an uplink channel predefined for SR information, or an uplink channel that is for SR information and that is determined by the communications apparatus by using the DCI. There may be one or more first uplink channels corresponding to the first BLER. It should be understood that the uplink channel that is for the SR information and that is determined by the communications apparatus by using the DCI is an uplink channel for indicating the SR information by using an uplink channel indicator field in the DCI.

Optional manner 6: The block error rate (BLER) corresponding to the channel state information report includes a first BLER or a second BLER. The at least one uplink channel includes a first uplink channel corresponding to the first BLER or a second uplink channel corresponding to the second BLER. Both the first uplink channel and the second uplink channel are uplink channels configured for SR information.

There may be one or more first uplink channels, and there may also be one or more second uplink channels.

Optionally, the communications apparatus receives indication information sent by the network device. The indication information includes first indication sub-information and second indication sub-information; the first indication sub-information is used to indicate a plurality of uplink channel sets corresponding to the channel state information report; and the second indication sub-information is used to indicate a BLER corresponding to the channel state information report. For details, refer to Table 5 and Table 6.

TABLE 6

| Second indication sub-information | |
|---|---|
| '11' | Channel state information report corresponds to a first BLER and a second BLER |
| '10' | Channel state information report corresponds to the first BLER |
| '01' | Channel state information report corresponds to the second BLER |
| '00' | No channel state information report is sent |

Based on Table 5 and Table 6, the uplink channel set is determined based on a quantity of BLERs. For example, N is a quantity of BLERs corresponding to the channel state information report. When N=1 and N=2, for uplink channels respectively determined by the communications apparatus, reference may be made to Table 7 and Table 8.

TABLE 7

| Quantity N of BLERs corresponding to a channel state information report | Uplink channel set |
|---|---|
| 1 | Uplink channel set 2 |
| 2 | Uplink channel set 3 |

TABLE 8

| Quantity N of BLERs corresponding to a channel state information report | Uplink channel set |
|---|---|
| 1 | Uplink channel set 1 and uplink channel set 2 |
| 2 | Uplink channel set 1 and uplink channel set 3 |

It should be noted that meanings indicated by "the first uplink channel" in the foregoing six optional manners may be different. Similarly, meanings indicated by "the second uplink channel" may be different. For ease of understanding, it may be considered that the foregoing four optional manners are independent of each other.

Step S802 is described as follows: When the BLER corresponding to the channel state information report includes a first BLER and a second BLER, and it is determined that the at least one uplink channel is a first

TABLE 5

| First indication sub-information | Only HARQ information is transmitted | HARQ information and a channel state information report (a first BLER or a second BLER) are transmitted | HARQ information and the channel state information report (the first BLER and the second BLER) are transmitted |
|---|---|---|---|
| '00' | Uplink channel set 1 | Uplink channel set 2 | Uplink channel set 3 |
| '01' | Uplink channel set 1 | Uplink channel set 2 | Uplink channel set 3 |
| '10' | Uplink channel set 1 | Uplink channel sets 1 and 2 | Uplink channel sets 1 and 3 |
| '11' | Uplink channel set 1 | Uplink channel sets 1 and 2 | Uplink channel sets 1 and 3 | uplink channel and a second uplink channel, the communications apparatus may transmit, on the first uplink channel, information corresponding to the first BLER, and transmit, on the second uplink channel, information corresponding to the second BLER. The information corresponding to the first BLER includes at least one of the following: a first CQI, a first PMI, a first RI, a first CRI, information about a first measurement link configuration set, and the like. The information corresponding to the second BLER includes at least one of the following: a second CQI, a second PMI, a second RI, a second CRI, information about a second measurement link configuration set, and the like. It should be noted that values of the information corresponding to the first BLER and the information corresponding to the second BLER may be the same or different.

Step S803 is described as follows: The network device knows the at least one uplink channel used to transmit the channel state information report, so that the network device can determine, based on the first correspondence shown in Table 1, the BLER corresponding to the channel state information report. For example, the network device knows that the uplink channels used to transmit the channel state information report are an uplink channel 1 and an uplink channel 2. Referring to Table 1, the network device determines that the BLER corresponding to the channel state information report is the second BLER.

Step S803 includes the following optional manners.

Optional manner 1: The at least one uplink channel includes a first uplink channel corresponding to a first BLER and a second uplink channel corresponding to a second BLER, and the BLER corresponding to the channel state information report includes the first BLER and the second BLER.

The first uplink channel is an uplink channel configured for HARQ information, or an uplink channel predefined for HARQ information. There may be one or more first uplink channels corresponding to the first BLER.

The second uplink channel is an uplink channel configured only for the channel state information report, or an uplink channel predefined only for the channel state information report. There may be one or more second uplink channels corresponding to the second BLER.

Optionally, a priority of the first BLER is lower than or equal to a priority of the second BLER.

Optional manner 2: The at least one uplink channel is a same uplink channel. The block error rate (BLER) corresponding to the channel state information report includes a first BLER and a second BLER.

Optionally, there may be one or more same uplink channels corresponding to the first BLER and the second BLER. The uplink channel is an uplink channel configured for HARQ information, or an uplink channel predefined for HARQ information. Alternatively, the uplink channel is an uplink channel configured only for the channel state information report, or an uplink channel predefined only for the channel state information report.

Optional manner 3: The at least one uplink channel includes a first uplink channel corresponding to a first BLER or a second uplink channel corresponding to a second BLER. The block error rate (BLER) corresponding to the channel state information report includes the first BLER or the second BLER. Both the first uplink channel and the second uplink channel are uplink channels configured for hybrid automatic repeat (HARQ) information.

Optional manner 4: The at least one uplink channel is a first uplink channel, and the block error rate (BLER) corresponding to the channel state information report includes N BLERs, where N is 1. The at least one uplink channel is a second uplink channel, and the block error rate (BLER) corresponding to the channel state information report includes N BLERs, where N is 2.

Optional manner 5: When the network device determines that HARQ information and the channel state information report correspond to a same uplink channel, the network device determines that the BLER corresponding to the channel state information report is a first BLER. When the network device determines that HARQ information and the channel state information report correspond to different uplink channels, the network device determines that the BLER corresponding to the channel state information report is a second BLER. A priority of the first BLER is lower than or equal to a priority of the second BLER, or the first BLER is greater than the second BLER.

Optional manner 6: When the network device determines that HARQ information and the channel state information report correspond to a same uplink channel, the network device determines that the BLER corresponding to the channel state information report is a first BLER. When the network device determines that HARQ information and the channel state information report correspond to different uplink channels, the network device determines that the BLERs corresponding to the channel state information reports are a first BLER and a second BLER. A priority of the first BLER is lower than or equal to a priority of the second BLER, or the first BLER is greater than the second BLER.

Optional manner 7: The at least one uplink channel includes a first uplink channel corresponding to a first BLER and a second uplink channel corresponding to a second BLER, and the BLER corresponding to the channel state information report includes the first BLER and the second BLER.

The first uplink channel may alternatively be an uplink channel configured for SR information, or an uplink channel predefined for SR information, or an uplink channel that is for SR information and that is determined by the communications apparatus by using the DCI. There may be one or more first uplink channels corresponding to the first BLER. It should be understood that the uplink channel that is for the SR information and that is determined by the communications apparatus by using the DCI is an uplink channel for indicating the SR information by using an uplink channel indicator field in the DCI.

Optional manner 8: The at least one uplink channel includes a first uplink channel corresponding to a first BLER or a second uplink channel corresponding to a second BLER. The BLER corresponding to the channel state information report includes the first BLER or the second BLER. Both the first uplink channel and the second uplink channel are uplink channels configured for SR information.

It should be noted that the method on the network device side is opposite to that on the communications apparatus side. To be specific, the network device determines, based on the at least one uplink channel and the correspondence, the BLER corresponding to the channel state information report, and the communications apparatus determines, based on the correspondence and the BLER corresponding to the channel state information report, the at least one uplink channel used to send the channel state information report. Therefore, for the method on the network device side, refer to the method on the terminal device side. The optional manners on the network device side are not described in detail in this application again.

It should be noted that the technical solution including step S801 and step S802 and the technical solution corresponding to step S803 may be independent of each other.

In conclusion, in an LTE system, the channel state information report corresponds to only one BLER, and therefore the method for determining the uplink channel used to send the channel state information report is not involved. However, in a 5G NR system, the channel state information report may correspond to a plurality of BLERs. Based on this, this application provides the method for determining, based on the correspondence and the BLER corresponding to the channel state information report, the uplink channel used to send the channel state information report. Similarly, this application further provides the method for determining, based on the at least one uplink channel and the correspondence, the BLER corresponding to the channel state information report, to improve system reliability.

Figure 9:
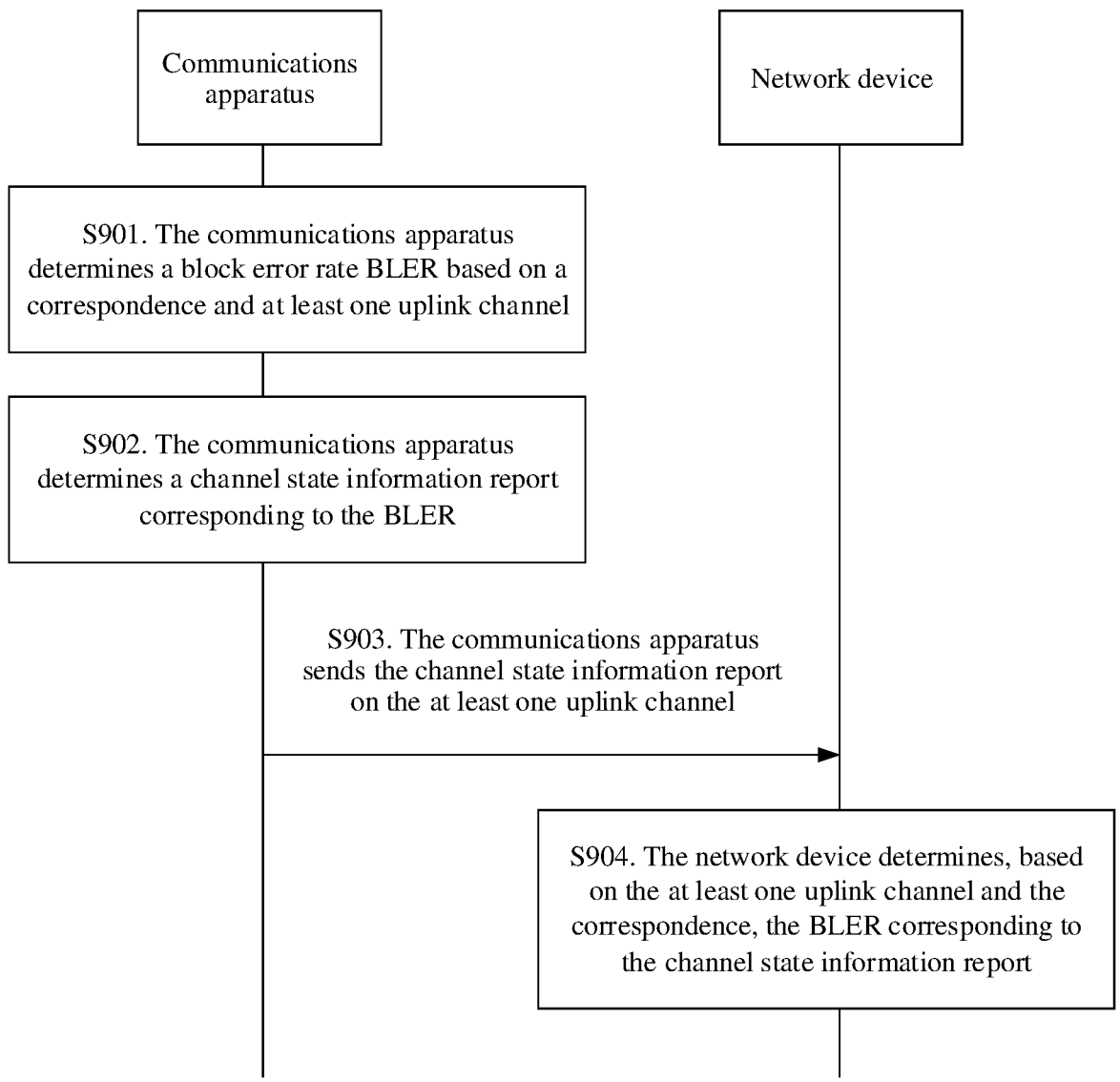
FIG. 9 is an interaction flowchart of a channel state information report transmission method according to another embodiment of this application.

FIG. 9 is an interaction flowchart of a channel state information report transmission method according to another embodiment of this application. As shown in FIG. 9, the method includes the following steps.

Step S901: A communications apparatus determines a block error rate (BLER) based on a correspondence and at least one uplink channel, where the correspondence includes a correspondence between the block error rate (BLER) and the at least one uplink channel.

Step S902: The communications apparatus determines a channel state information report corresponding to the BLER.

Step S903: The communications apparatus sends the channel state information report on the at least one uplink channel.

Step S904. A network device determines, based on the at least one uplink channel and the correspondence, the BLER corresponding to the channel state information report, where the correspondence includes the correspondence between the block error rate (BLER) and the at least one uplink channel.

Step S901 is described as follows.

Optional manner 1: The at least one uplink channel includes a first uplink channel corresponding to a first BLER and a second uplink channel corresponding to a second BLER, and the BLER corresponding to the channel state information report includes the first BLER and the second BLER.

The first uplink channel is an uplink channel configured for HARQ information, or an uplink channel predefined for HARQ information. There may be one or more first uplink channels corresponding to the first BLER.

The second uplink channel is an uplink channel configured only for the channel state information report, or an uplink channel predefined only for the channel state information report. There may be one or more second uplink channels corresponding to the second BLER.

Optionally, a priority of the first BLER is lower than or equal to a priority of the second BLER.

Optional manner 2: The at least one uplink channel is a same uplink channel. The block error rate (BLER) corresponding to the channel state information report includes a first BLER and a second BLER.

Optionally, there may be one or more same uplink channels corresponding to the first BLER and the second BLER. The uplink channel is an uplink channel configured for HARQ information, or an uplink channel predefined for HARQ information. Alternatively, the uplink channel is an uplink channel configured only for the channel state information report, or an uplink channel predefined only for the channel state information report.

Optional manner 3: The at least one uplink channel includes a first uplink channel corresponding to a first BLER or a second uplink channel corresponding to a second BLER. The block error rate (BLER) corresponding to the channel state information report includes the first BLER or the second BLER. Both the first uplink channel and the second uplink channel are uplink channels configured for hybrid automatic repeat (HARQ) information.

Optional manner 4: The at least one uplink channel is a first uplink channel, and the block error rate (BLER) corresponding to the channel state information report includes N BLERs, where N is 1. The at least one uplink channel is a second uplink channel, and the block error rate (BLER) corresponding to the channel state information report includes N BLERs, where N is 2.

Optional manner 5: When the communications apparatus determines that HARQ information and the channel state information report correspond to a same uplink channel, the communications apparatus determines that the BLER corresponding to the channel state information report is a first BLER. When the communications apparatus determines that HARQ information and the channel state information report correspond to different uplink channels, the communications apparatus determines that the BLER corresponding to the channel state information report is a second BLER. A priority of the first BLER is lower than or equal to a priority of the second BLER, or the first BLER is greater than the second BLER.

Optional manner 6: When the communications apparatus determines that HARQ information and the channel state information report correspond to a same uplink channel, the communications apparatus determines that the BLER corresponding to the channel state information report is a first BLER. When the communications apparatus determines that HARQ information and the channel state information report correspond to different uplink channels, the communications apparatus determines that the BLERs corresponding to the channel state information reports are a first BLER and a second BLER. A priority of the first BLER is lower than or equal to a priority of the second BLER, or the first BLER is greater than the second BLER.

Optional manner 7: The at least one uplink channel includes a first uplink channel corresponding to a first BLER and a second uplink channel corresponding to a second BLER, and the BLER corresponding to the channel state information report includes the first BLER and the second BLER.

The first uplink channel may alternatively be an uplink channel configured for SR information, or an uplink channel predefined for SR information, or an uplink channel that is for SR information and that is determined by the communications apparatus by using the DCI. There may be one or more first uplink channels corresponding to the first BLER. It should be understood that the uplink channel that is for the SR information and that is determined by the communications apparatus by using the DCI is an uplink channel for indicating the SR information by using an uplink channel indicator field in the DCI.

Optional manner 8: The at least one uplink channel includes a first uplink channel corresponding to a first BLER or a second uplink channel corresponding to a second BLER. The BLER corresponding to the channel state information report includes the first BLER or the second BLER. Both the first uplink channel and the second uplink channel are uplink channels configured for SR information.

It should be noted that the method of the communications apparatus is the same as that of the network device corresponding to FIG. 8. Details are not described in this application again.

Step S904 is the same as step S803. For specific content of step S904, refer to specific content of step S803. Details are not described in this application again.

In conclusion, in an LTE system, the channel state information report corresponds to only one BLER, and therefore the method for determining, based on the at least one uplink channel and the correspondence, the BLER corresponding to the channel state information report is not involved. However, in a 5G NR system, the channel state information report may correspond to a plurality of BLERs. Based on this, this application provides the method for determining, based on the at least one uplink channel and the correspondence, the BLER corresponding to the channel state information report, to improve system reliability.

Figure 10:
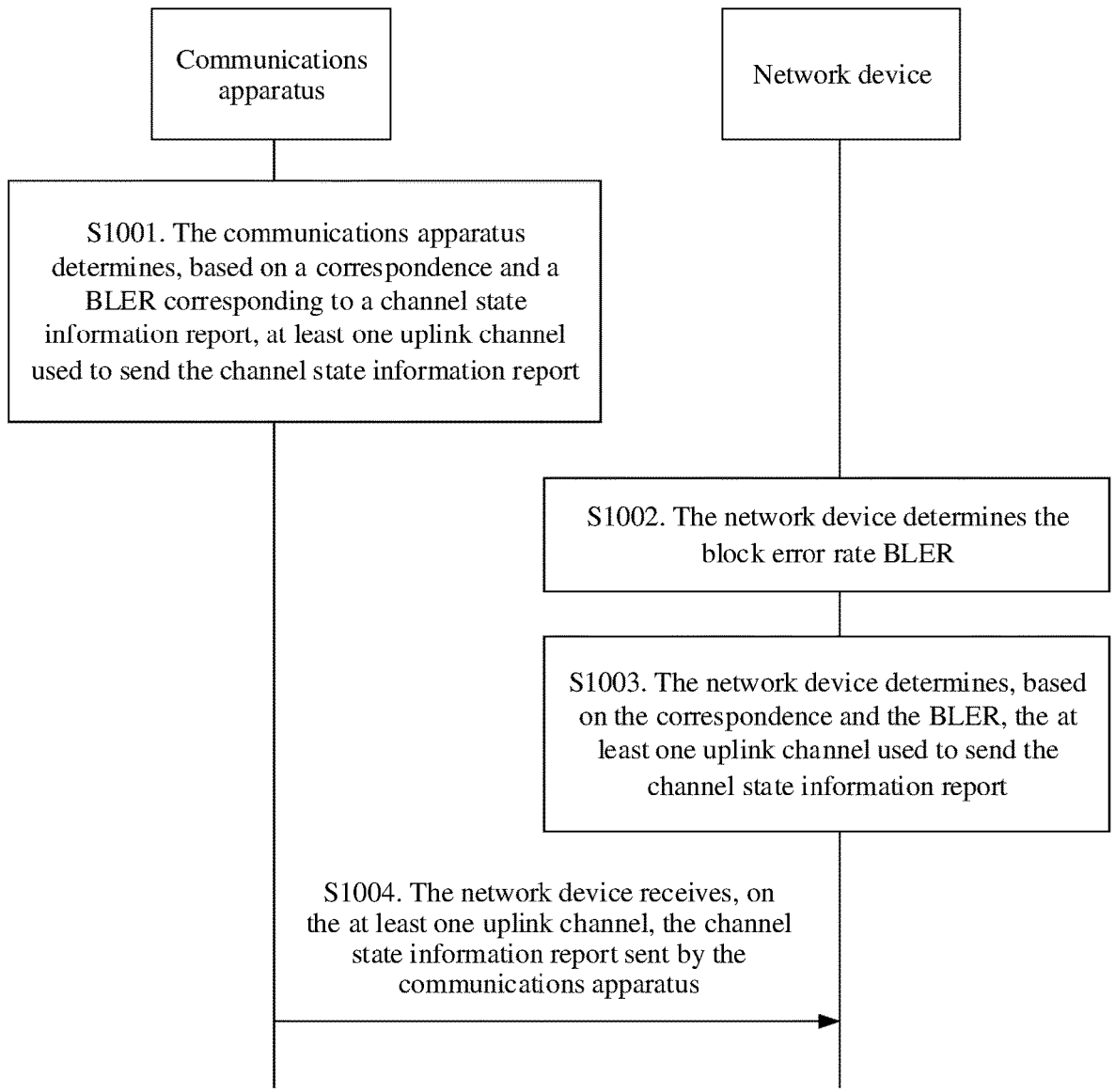
FIG. 10 is an interaction flowchart of a channel state information report transmission method according to an embodiment of this application.

FIG. 10 is an interaction flowchart of a channel state information report transmission method according to an embodiment of this application. As shown in FIG. 10, the method includes the following steps:

Step S1001: A communications apparatus determines, based on a correspondence and a BLER corresponding to a channel state information report, at least one uplink channel used to send the channel state information report, where the correspondence includes a correspondence between the block error rate (BLER) and the at least one uplink channel.

Step S1002: A network device determines the block error rate (BLER).

Step S1003: The network device determines, based on the correspondence and the BLER, the at least one uplink channel used to send the channel state information report, where the correspondence includes the correspondence between the block error rate (BLER) and the at least one uplink channel.

Step S1004: The network device receives, on the at least one uplink channel, the channel state information report sent by the communications apparatus.

Step S1001 is the same as step S801. Details are not described in this application again.

Step S1003 is performed by the network device, and step S801 is performed by the communications apparatus. The network device and the communications apparatus perform the same method. Therefore, for specific content of step S1003, refer to specific content of step S801. Details are not described in this application again.

In conclusion, in an LTE system, the channel state information report corresponds to only one BLER, and therefore the method for determining the uplink channel used to send the channel state information report is not involved. However, in a 5G NR system, the channel state information report may correspond to a plurality of BLERs. Based on this, this application provides the method for determining, based on the correspondence and the BLER corresponding to the channel state information report, the uplink channel used to send the channel state information report, to improve system reliability.

Figure 11:
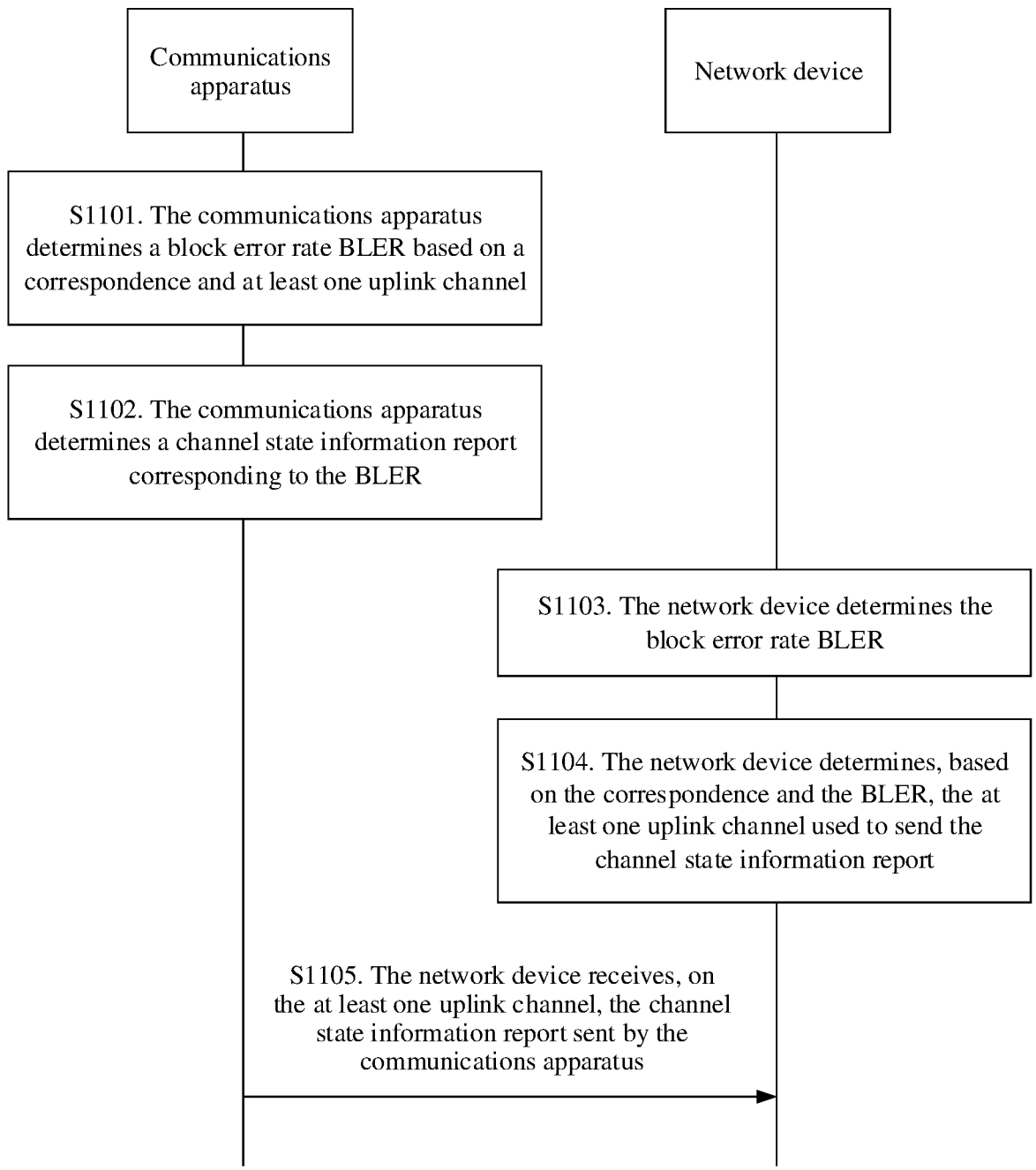
FIG. 11 is an interaction flowchart of a channel state information report transmission method according to another embodiment of this application.

FIG. 11 is an interaction flowchart of a channel state information report transmission method according to another embodiment of this application. As shown in FIG. 11, the method includes the following steps:

Step S1101: A communications apparatus determines a block error rate (BLER) based on a correspondence and at least one uplink channel, where the correspondence includes a correspondence between the block error rate (BLER) and the at least one uplink channel.

Step S1102: The communications apparatus determines a channel state information report corresponding to the BLER.

Step S1103: A network device determines the block error rate (BLER).

Step S1104: The network device determines, based on the correspondence and the BLER, the at least one uplink channel used to send the channel state information report, where the correspondence includes the correspondence between the block error rate (BLER) and the at least one uplink channel.

Step S1105: The network device receives, on the at least one uplink channel, the channel state information report sent by the communications apparatus.

Step S1101 is the same as step S901. Details are not described in this application again.

Step S1104 is performed by the network device, and step S801 is performed by the communications apparatus. The network device and the communications apparatus perform the same method. Therefore, for specific content of step S1104, refer to specific content of step S801. Details are not described in this application again.

In conclusion, in an LTE system, the channel state information report corresponds to only one BLER, and therefore the method for determining the uplink channel used to send the channel state information report is not involved. However, in a 5G NR system, the channel state information report may correspond to a plurality of BLERs. Based on this, this application provides the method for determining, based on the correspondence and the BLER corresponding to the channel state information report, the uplink channel used to send the channel state information report. Similarly, this application further provides the method for determining, based on the at least one uplink channel and the correspondence, the BLER corresponding to the channel state information report, to improve system reliability.

Figure 12:
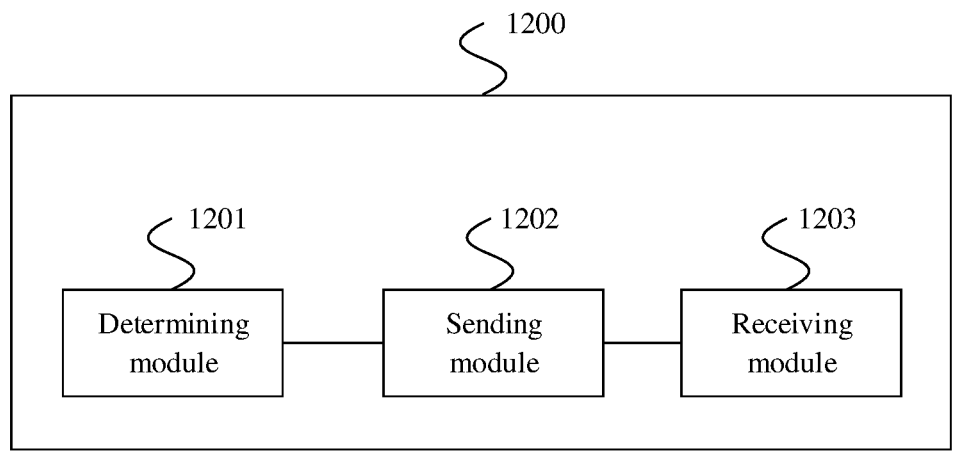
FIG. 12 is a schematic diagram of a communications device 1200 according to an embodiment of this application.

FIG. 12 is a schematic diagram of a communications device 1200 according to an embodiment of this application. As shown in FIG. 12, the communications device is a communications apparatus and includes: a determining module 1201, configured to determine N channel state information reports; and a sending module 1202, configured to send M of the N channel state information reports based on priorities of the N channel state information reports, where both N and M are positive integers greater than or equal to 1, and M is less than or equal to N; and the priority of the channel state information report is determined based on a priority of a block error rate (BLER) corresponding to the channel state information report.

The determining module 1201 is further configured to determine, based on at least one piece of information of at least one of the N channel state information reports, a BLER corresponding to the at least one channel state information report.

Optionally, the communications device further includes a receiving module 1203, configured to receive first indication information. The determining module 1201 is further configured to determine, based on a format of the first indication information, a BLER corresponding to at least one of the N channel state information reports.

Optionally, the receiving module 1203 is further configured to receive second indication information, where the second indication information is used to indicate that only a channel state information report corresponding to one BLER can be sent; and the second indication information is higher layer signaling or downlink control information (DCI).

Optionally, the priority of the BLER is predefined; or the priority of the BLER is determined based on the higher layer signaling; or the priority of the BLER is determined based on the downlink control information (DCI).

Optionally, a quantity of bits of the N channel state information reports is greater than a maximum quantity of carried bits on an uplink channel; a quantity of bits of the M channel state information reports is less than or equal to the maximum quantity of carried bits; and the uplink channel is used to transmit the M channel state information reports; or a sum of a quantity of bits of the N channel state information reports and a quantity of bits of at least one piece of information is greater than a maximum quantity of carried bits on an uplink channel; a sum of a quantity of bits of the M channel state information reports and the quantity of bits of the at least one piece of information is less than or equal to the maximum quantity of carried bits; and the uplink channel is used to transmit the M channel state information reports and the at least one piece of information.

Optionally, the maximum quantity of carried bits is determined based on at least one of the following: a maximum bit rate that the uplink channel can support for carrying information, a time domain resource occupied by the uplink channel, a frequency domain resource occupied by the uplink channel, and a format of the uplink channel.

This application provides a communications device. The communications device may be configured to perform the foregoing channel state information report transmission method. An implementation principle and a technical effect of the communications device are similar to those of the foregoing channel state information report transmission method. Details are not described in this application again.

Figure 13:
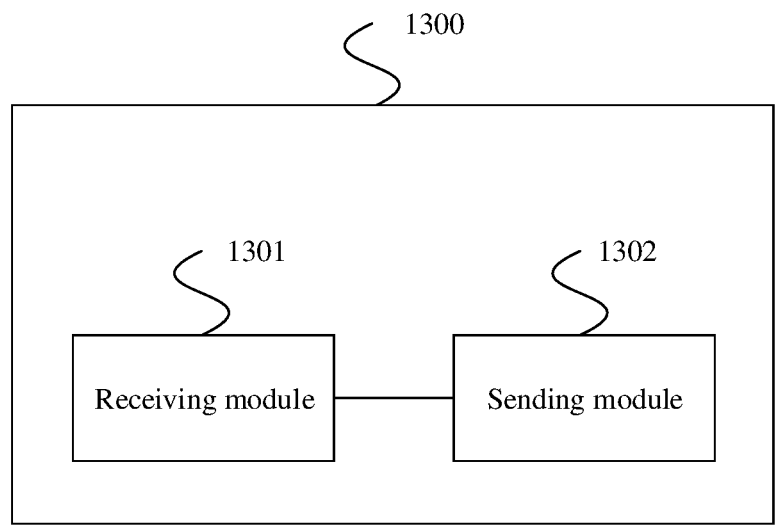
FIG. 13 is a schematic diagram of a communications device 1300 according to an embodiment of this application.

FIG. 13 is a schematic diagram of a communications device 1300 according to an embodiment of this application. As shown in FIG. 13, the communications device is a network device and includes: a receiving module 1301, configured to receive M channel state information reports, where the M channel state information reports are determined based on priorities of N channel state information reports, both N and M are positive integers greater than or equal to 1, and M is less than or equal to N.

Optionally, the communications device further includes a sending module 1302, configured to send first indication information, where the first indication information is used to determine a block error rate (BLER) corresponding to a channel state information report.

Optionally, the sending module 1302 is further configured to send second indication information, where the second indication information is used to indicate that only a channel state information report corresponding to one BLER can be sent; and the second indication information is higher layer signaling or downlink control information (DCI).

Optionally, a priority of the BLER is predefined; or a priority of the BLER is determined based on the higher layer signaling; or a priority of the BLER is determined based on the downlink control information (DCI).

Optionally, a quantity of bits of the N channel state information reports is greater than a maximum quantity of carried bits on an uplink channel; a quantity of bits of the M channel state information reports is less than or equal to the maximum quantity of carried bits; and the uplink channel is used to transmit the M channel state information reports; or a sum of a quantity of bits of the N channel state information reports and a quantity of bits of at least one piece of information is greater than a maximum quantity of carried bits on an uplink channel; a sum of a quantity of bits of the M channel state information reports and the quantity of bits of the at least one piece of information is less than or equal to the maximum quantity of carried bits; and the uplink channel is used to transmit the M channel state information reports and the at least one piece of information.

Optionally, the maximum quantity of carried bits is determined based on at least one of the following: a maximum bit rate that the uplink channel can support for carrying information, a time domain resource occupied by the uplink channel, a frequency domain resource occupied by the uplink channel, and a format of the uplink channel.

This application provides a communications device. The communications device may be configured to perform the foregoing channel state information report transmission method. An implementation principle and a technical effect of the communications device are similar to those of the foregoing channel state information report transmission method. Details are not described in this application again.

Figure 14:
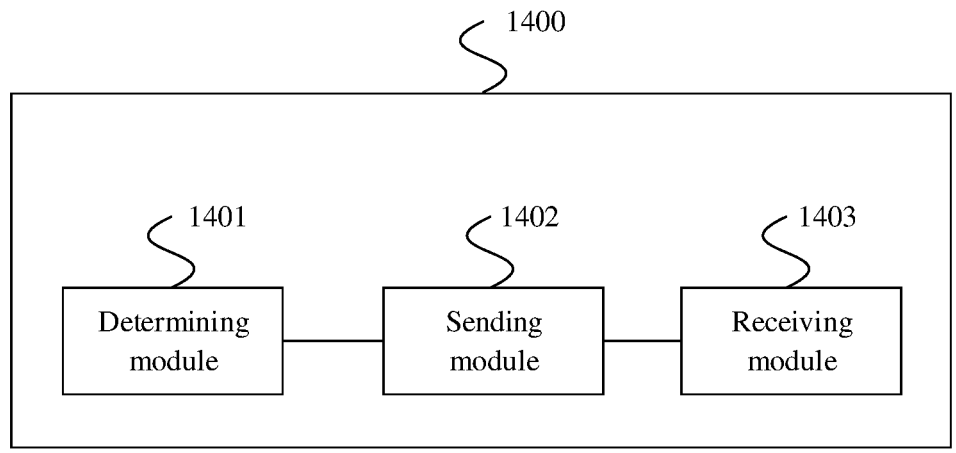
FIG. 14 is a schematic diagram of a communications device 1400 according to an embodiment of this application.

FIG. 14 is a schematic diagram of a communications device 1400 according to an embodiment of this application. As shown in FIG. 14, the communications device is a communications apparatus and includes: a determining module 1401, configured to determine, based on a correspondence and a block error rate (BLER) corresponding to a channel state information report, at least one uplink channel used to send the channel state information report, where the correspondence includes a correspondence between the block error rate (BLER) and the at least one uplink channel; and a sending module 1402, configured to send the channel state information report on the at least one uplink channel.

Optionally, the BLER corresponding to the channel state information report includes a first BLER and a second BLER. The at least one uplink channel includes a first uplink channel corresponding to the first BLER and a second uplink channel corresponding to the second BLER. The first uplink channel is an uplink channel configured for HARQ information. The second uplink channel is an uplink channel configured only for the channel state information report.

Optionally, a priority of the first BLER is lower than or equal to a priority of the second BLER.

Optionally, the communications device further includes a receiving module 1403, configured to receive indication information, where the indication information includes first indication sub-information and second indication sub-information; the first indication sub-information is used to indicate a first uplink channel set; the second indication sub-information is used to indicate a second uplink channel set; the first uplink channel set includes the first uplink channel; and the second uplink channel set includes the second uplink channel.

Optionally, the correspondence is predefined; or the correspondence is determined based on higher layer signaling; or the correspondence is determined based on downlink control information (DCI).

Optionally, the block error rate (BLER) corresponding to the channel state information report includes the first BLER and the second BLER. The at least one uplink channel is a same uplink channel corresponding to the first BLER and the second BLER.

Optionally, the block error rate (BLER) corresponding to the channel state information report includes the first BLER or the second BLER. The at least one uplink channel includes the first uplink channel corresponding to the first BLER or the second uplink channel corresponding to the second BLER. Both the first uplink channel and the second uplink channel are uplink channels configured for the hybrid automatic repeat (HARQ) information.

Optionally, the block error rate (BLER) corresponding to the channel state information report includes N BLERs, and N is a positive integer greater than or equal to 1. When N is equal to 1, the at least one uplink channel includes a first uplink channel corresponding to the N BLERs; or when N is greater than 1, the at least one uplink channel includes a second uplink channel corresponding to the N BLERs.

This application provides a communications device. The communications device may be configured to perform the foregoing channel state information report transmission method. An implementation principle and a technical effect of the communications device are similar to those of the foregoing channel state information report transmission method. Details are not described in this application again.

Figure 15:
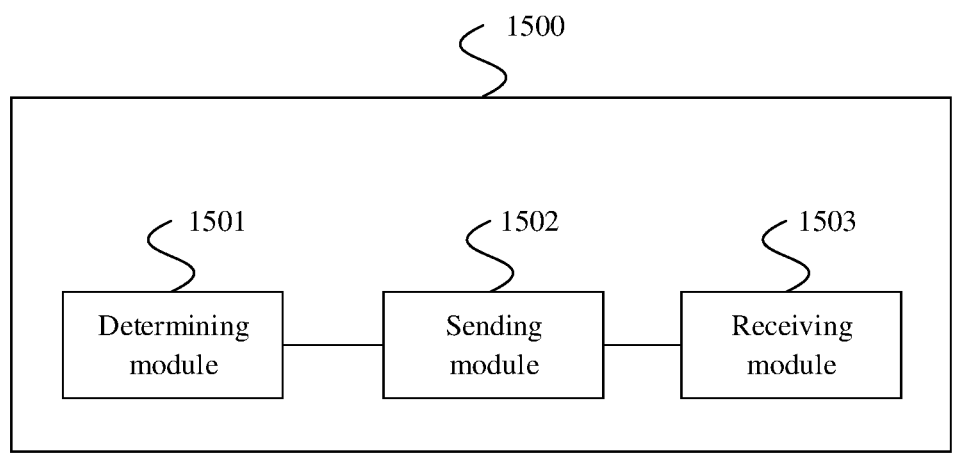
FIG. 15 is a schematic diagram of a communications device 1500 according to an embodiment of this application.

FIG. 15 is a schematic diagram of a communications device 1500 according to an embodiment of this application. As shown in FIG. 15, the communications device is a communications apparatus and includes: a determining module 1501, configured to determine a block error rate (BLER) based on a correspondence and at least one uplink channel, where the correspondence includes a correspondence between the block error rate (BLER) and the at least one uplink channel, where the determining module 1501 is further configured to determine a channel state information report corresponding to the BLER; and a sending module 1502, configured to send the channel state information report on the at least one uplink channel.

Optionally, the BLER corresponding to the channel state information report includes a first BLER and a second BLER. The at least one uplink channel includes a first uplink channel corresponding to the first BLER and a second uplink channel corresponding to the second BLER. The first uplink channel is an uplink channel configured for HARQ information. The second uplink channel is an uplink channel configured only for the channel state information report.

Optionally, a priority of the first BLER is lower than or equal to a priority of the second BLER.

Optionally, the communications device further includes a receiving module 1503, configured to receive indication information, where the indication information includes first indication sub-information and second indication sub-information; the first indication sub-information is used to indicate a first uplink channel set; the second indication sub-information is used to indicate a second uplink channel set; the first uplink channel set includes the first uplink channel; and the second uplink channel set includes the second uplink channel.

Optionally, the correspondence is predefined; or the correspondence is determined based on higher layer signaling; or the correspondence is determined based on downlink control information (DCI).

Optionally, the block error rate (BLER) corresponding to the channel state information report includes the first BLER and the second BLER. The at least one uplink channel is a same uplink channel corresponding to the first BLER and the second BLER.

Optionally, the block error rate (BLER) corresponding to the channel state information report includes the first BLER or the second BLER. The at least one uplink channel includes the first uplink channel corresponding to the first BLER or the second uplink channel corresponding to the second BLER. Both the first uplink channel and the second uplink channel are uplink channels configured for the hybrid automatic repeat (HARQ) information.

Optionally, the block error rate (BLER) corresponding to the channel state information report includes N BLERs, and N is a positive integer greater than or equal to 1. When N is equal to 1, the at least one uplink channel includes a first uplink channel corresponding to the N BLERs; or when N is greater than 1, the at least one uplink channel includes a second uplink channel corresponding to the N BLERs.

This application provides a communications device. The communications device may be configured to perform the foregoing channel state information report transmission method. An implementation principle and a technical effect of the communications device are similar to those of the foregoing channel state information report transmission method. Details are not described in this application again.

Figure 16:
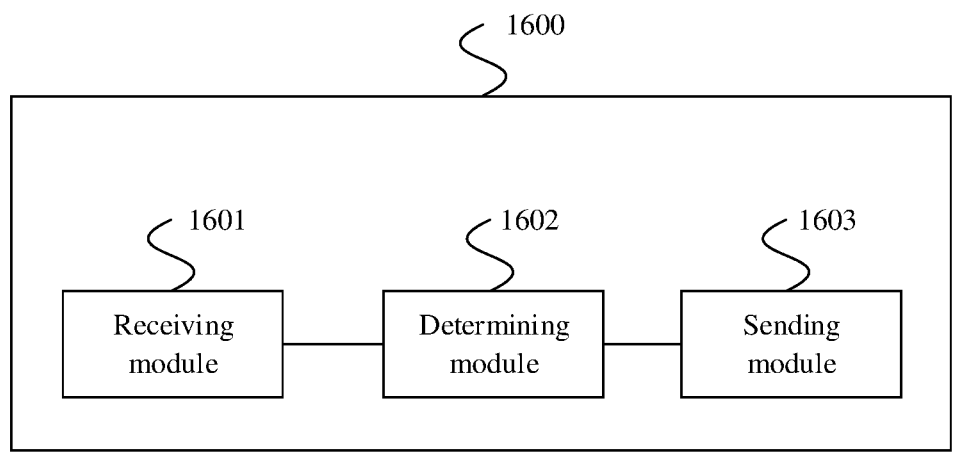
FIG. 16 is a schematic diagram of a communications device 1600 according to an embodiment of this application.

FIG. 16 is a schematic diagram of a communications device 1600 according to an embodiment of this application. As shown in FIG. 16, the communications device is a network device and includes: a receiving module 1601, configured to receive a channel state information report on at least one uplink channel; and a determining module 1602, configured to determine, based on the at least one uplink channel and a correspondence, a block error rate (BLER) corresponding to the channel state information report, where the correspondence includes a correspondence between the block error rate (BLER) and the at least one uplink channel.

Optionally, the BLER corresponding to the channel state information report includes a first BLER and a second BLER. The at least one uplink channel includes a first uplink channel corresponding to the first BLER and a second uplink channel corresponding to the second BLER. The first uplink channel is an uplink channel configured for hybrid automatic repeat (HARQ) information. The second uplink channel is an uplink channel configured only for the channel state information report.

Optionally, a priority of the first BLER is lower than or equal to a priority of the second BLER.

Optionally, the communications device further includes a sending module 1603, configured to send indication information, where the indication information includes first indication sub-information and second indication sub-information; the first indication sub-information is used to indicate a first uplink channel set; the second indication sub-information is used to indicate a second uplink channel set; the first uplink channel set includes the first uplink channel; and the second uplink channel set includes the second uplink channel.

This application provides a communications device. The communications device may be configured to perform the foregoing channel state information report transmission method. An implementation principle and a technical effect of the communications device are similar to those of the foregoing channel state information report transmission method. Details are not described in this application again.

Figure 17:
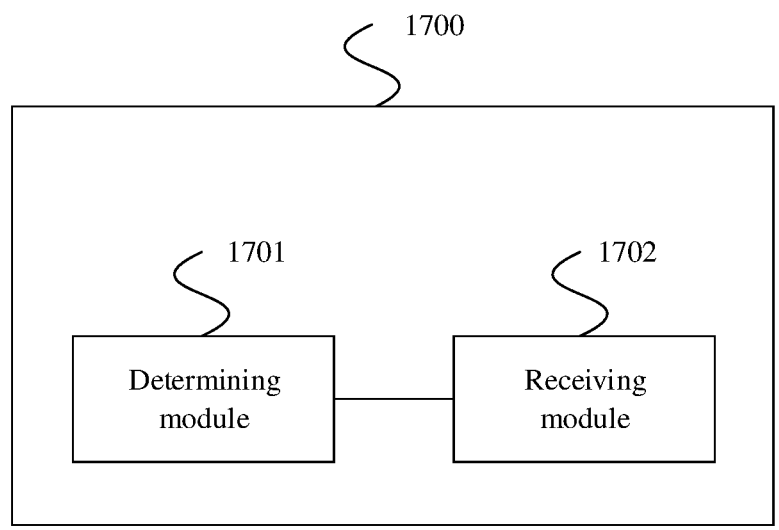
FIG. 17 is a schematic diagram of a communications device 1700 according to an embodiment of this application.

FIG. 17 is a schematic diagram of a communications device 1700 according to an embodiment of this application. As shown in FIG. 17, the communications device is a network device and includes: a determining module 1701, configured to determine a block error rate (BLER), where the determining module 1701 is further configured to determine, based on a correspondence and the BLER, at least one uplink channel used to send a channel state information report, where the correspondence includes a correspondence between the block error rate (BLER) and the at least one uplink channel; and a receiving module 1702, configured to receive the channel state information report on the at least one uplink channel.

Optionally, the correspondence is predefined; or the correspondence is determined based on higher layer signaling; or the correspondence is determined based on downlink control information (DCI).

Optionally, the block error rate (BLER) corresponding to the channel state information report includes a first BLER and a second BLER, and the at least one uplink channel is a same uplink channel corresponding to the first BLER and the second BLER.

Optionally, the block error rate (BLER) corresponding to the channel state information report includes a first BLER or a second BLER. The at least one uplink channel includes a first uplink channel corresponding to the first BLER or a second uplink channel corresponding to the second BLER. Both the first uplink channel and the second uplink channel are uplink channels configured for hybrid automatic repeat (HARQ) information.

Optionally, the block error rate (BLER) corresponding to the channel state information report includes N BLERs, and N is a positive integer greater than or equal to 1. When N is equal to 1, the at least one uplink channel includes a first uplink channel corresponding to the N BLERs; or when N is greater than 1, the at least one uplink channel includes a second uplink channel corresponding to the N BLERs.

This application provides a communications device. The communications device may be configured to perform the foregoing channel state information report transmission method. An implementation principle and a technical effect of the communications device are similar to those of the foregoing channel state information report transmission method. Details are not described in this application again.

Figure 18:
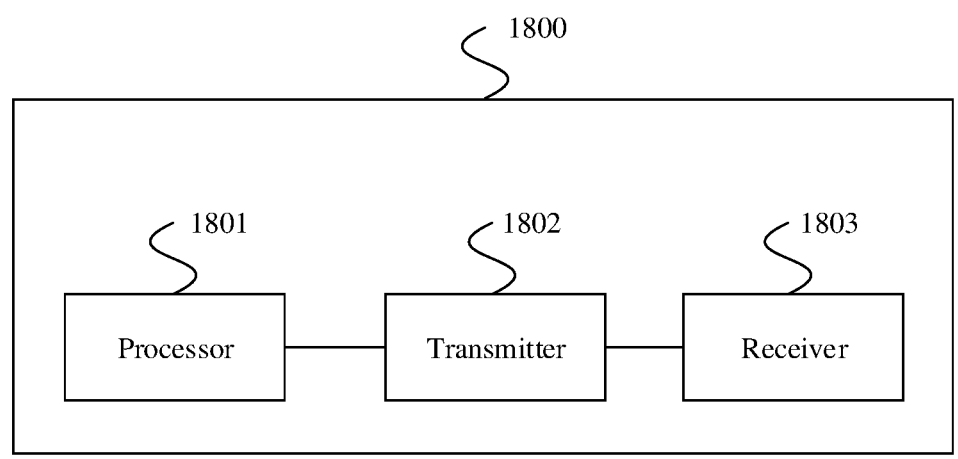
FIG. 18 is a schematic diagram of a communications device 1800 according to an embodiment of this application.

FIG. 18 is a schematic diagram of a communications device 1800 according to an embodiment of this application. As shown in FIG. 18, the communications device is a communications apparatus, for example, a terminal device, and includes: a processor 1801, configured to determine N channel state information reports; and a transmitter 1802, configured to send M of the N channel state information reports based on priorities of the N channel state information reports, where both N and M are positive integers greater than or equal to 1, and M is less than or equal to N; and the priority of the channel state information report is determined based on a priority of a block error rate (BLER) corresponding to the channel state information report.

The processor 1801 is further configured to determine, based on at least one piece of information of at least one of the N channel state information reports, a BLER corresponding to the at least one channel state information report.

Optionally, the communications device further includes a receiver 1803, configured to receive first indication information. The processor 1801 is further configured to determine, based on a format of the first indication information, a BLER corresponding to at least one of the N channel state information reports.

Optionally, the receiver 1803 is further configured to receive second indication information, where the second indication information is used to indicate that only a channel state information report corresponding to one BLER can be sent; and the second indication information is higher layer signaling or downlink control information (DCI).

Optionally, the priority of the BLER is predefined; or the priority of the BLER is determined based on the higher layer signaling; or the priority of the BLER is determined based on the downlink control information (DCI).

Optionally, a quantity of bits of the N channel state information reports is greater than a maximum quantity of carried bits on an uplink channel; a quantity of bits of the M channel state information reports is less than or equal to the maximum quantity of carried bits; and the uplink channel is used to transmit the M channel state information reports; or a sum of a quantity of bits of the N channel state information reports and a quantity of bits of at least one piece of information is greater than a maximum quantity of carried bits on an uplink channel; a sum of a quantity of bits of the M channel state information reports and the quantity of bits of the at least one piece of information is less than or equal to the maximum quantity of carried bits; and the uplink channel is used to transmit the M channel state information reports and the at least one piece of information.

Optionally, the maximum quantity of carried bits is determined based on at least one of the following: a maximum bit rate that the uplink channel can support for carrying information, a time domain resource occupied by the uplink channel, a frequency domain resource occupied by the uplink channel, and a format of the uplink channel.

This application provides a communications device. The communications device may be configured to perform the foregoing channel state information report transmission method. An implementation principle and a technical effect of the communications device are similar to those of the foregoing channel state information report transmission method. Details are not described in this application again.

Figure 19:
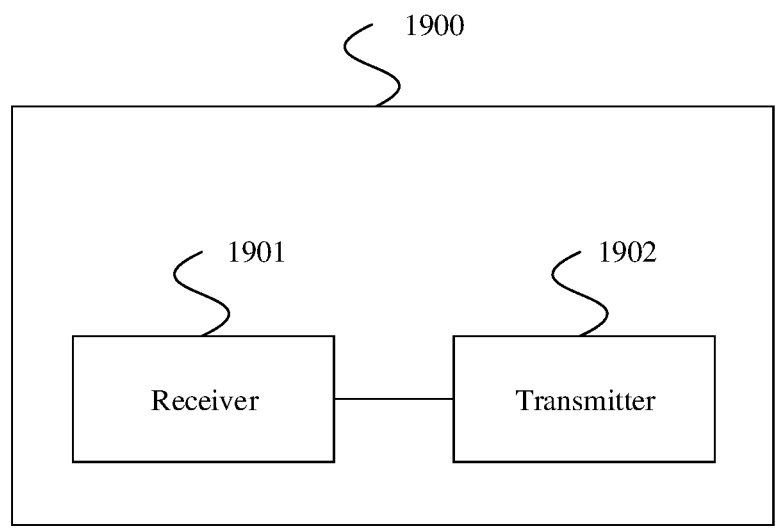
FIG. 19 is a schematic diagram of a communications device 1900 according to an embodiment of this application.

FIG. 19 is a schematic diagram of a communications device 1900 according to an embodiment of this application. As shown in FIG. 19, the communications device is a network device and includes: a receiver 1901, configured to receive M channel state information reports, where the M channel state information reports are determined based on priorities of N channel state information reports, both N and M are positive integers greater than or equal to 1, and M is less than or equal to N.

Optionally, the communications device further includes a transmitter 1902, configured to send first indication information, where the first indication information is used to determine a block error rate (BLER) corresponding to a channel state information report.

Optionally, the transmitter 1902 is further configured to send second indication information, where the second indication information is used to indicate that only a channel state information report corresponding to one BLER can be sent; and the second indication information is higher layer signaling or downlink control information (DCI).

Optionally, a priority of the BLER is predefined; or a priority of the BLER is determined based on the higher layer signaling; or a priority of the BLER is determined based on the downlink control information (DCI).

Optionally, a quantity of bits of the N channel state information reports is greater than a maximum quantity of carried bits on an uplink channel; a quantity of bits of the M channel state information reports is less than or equal to the maximum quantity of carried bits; and the uplink channel is used to transmit the M channel state information reports; or a sum of a quantity of bits of the N channel state information reports and a quantity of bits of at least one piece of information is greater than a maximum quantity of carried bits on an uplink channel; a sum of a quantity of bits of the M channel state information reports and the quantity of bits of the at least one piece of information is less than or equal to the maximum quantity of carried bits; and the uplink channel is used to transmit the M channel state information reports and the at least one piece of information.

Optionally, the maximum quantity of carried bits is determined based on at least one of the following: a maximum bit rate that the uplink channel can support for carrying information, a time domain resource occupied by the uplink channel, a frequency domain resource occupied by the uplink channel, and a format of the uplink channel.

This application provides a communications device. The communications device may be configured to perform the foregoing channel state information report transmission method. An implementation principle and a technical effect of the communications device are similar to those of the foregoing channel state information report transmission method. Details are not described in this application again.

Figure 20:
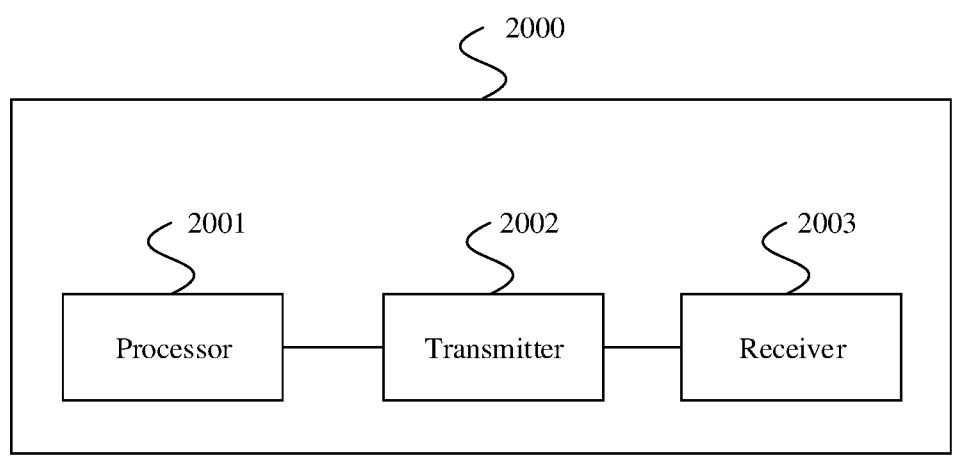
FIG. 20 is a schematic diagram of a communications device 2000 according to an embodiment of this application.

FIG. 20 is a schematic diagram of a communications device 2000 according to an embodiment of this application. As shown in FIG. 20, the communications device is a communications apparatus and includes: a processor 2001, configured to determine, based on a correspondence and a block error rate (BLER) corresponding to a channel state information report, at least one uplink channel used to send the channel state information report, where the correspondence includes a correspondence between the block error rate (BLER) and the at least one uplink channel; and a transmitter 2002, configured to send the channel state information report on the at least one uplink channel.

Optionally, the BLER corresponding to the channel state information report includes a first BLER and a second BLER. The at least one uplink channel includes a first uplink channel corresponding to the first BLER and a second uplink channel corresponding to the second BLER. The first uplink channel is an uplink channel configured for HARQ information. The second uplink channel is an uplink channel configured only for the channel state information report.

Optionally, a priority of the first BLER is lower than or equal to a priority of the second BLER.

Optionally, the communications device further includes a receiver 2003, configured to receive indication information, where the indication information includes first indication sub-information and second indication sub-information; the first indication sub-information is used to indicate a first uplink channel set; the second indication sub-information is used to indicate a second uplink channel set; the first uplink channel set includes the first uplink channel; and the second uplink channel set includes the second uplink channel.

Optionally, the correspondence is predefined; or the correspondence is determined based on higher layer signaling; or the correspondence is determined based on downlink control information (DCI).

Optionally, the block error rate (BLER) corresponding to the channel state information report includes the first BLER and the second BLER. The at least one uplink channel is a same uplink channel corresponding to the first BLER and the second BLER.

Optionally, the block error rate BLER corresponding to the channel state information report includes the first BLER or the second BLER. The at least one uplink channel includes the first uplink channel corresponding to the first BLER or the second uplink channel corresponding to the second BLER. Both the first uplink channel and the second uplink channel are uplink channels configured for the hybrid automatic repeat (HARQ) information.

Optionally, the block error rate (BLER) corresponding to the channel state information report includes N BLERs, and N is a positive integer greater than or equal to 1. When N is equal to 1, the at least one uplink channel includes a first uplink channel corresponding to the N BLERs; or when N is greater than 1, the at least one uplink channel includes a second uplink channel corresponding to the N BLERs.

This application provides a communications device. The communications device may be configured to perform the foregoing channel state information report transmission method. An implementation principle and a technical effect of the communications device are similar to those of the foregoing channel state information report transmission method. Details are not described in this application again.

Figure 21:
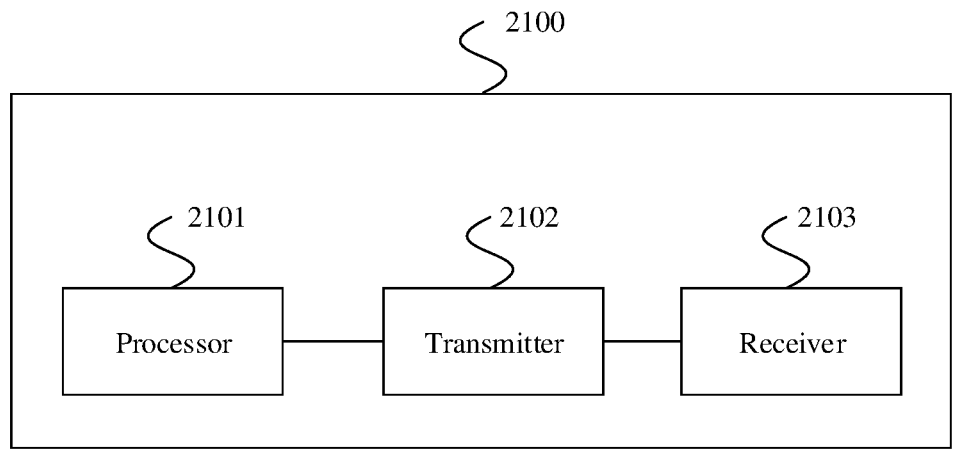
FIG. 21 is a schematic diagram of a communications device 2100 according to an embodiment of this application.

FIG. 21 is a schematic diagram of a communications device 2100 according to an embodiment of this application. As shown in FIG. 21, the communications device is a communications apparatus and includes: a processor 2101, configured to determine a block error rate (BLER) based on a correspondence and at least one uplink channel, where the correspondence includes a correspondence between the block error rate (BLER) and the at least one uplink channel, where the processor 2101 is further configured to determine a channel state information report corresponding to the BLER; and a transmitter 2102, configured to send the channel state information report on the at least one uplink channel.

Optionally, the BLER corresponding to the channel state information report includes a first BLER and a second BLER. The at least one uplink channel includes a first uplink channel corresponding to the first BLER and a second uplink channel corresponding to the second BLER. The first uplink channel is an uplink channel configured for HARQ information. The second uplink channel is an uplink channel configured only for the channel state information report.

Optionally, a priority of the first BLER is lower than or equal to a priority of the second BLER.

Optionally, the communications device further includes a receiver 2103, configured to receive indication information, where the indication information includes first indication sub-information and second indication sub-information; the first indication sub-information is used to indicate a first uplink channel set; the second indication sub-information is used to indicate a second uplink channel set; the first uplink channel set includes the first uplink channel; and the second uplink channel set includes the second uplink channel.

Optionally, the correspondence is predefined; or the correspondence is determined based on higher layer signaling; or the correspondence is determined based on downlink control information (DCI).

Optionally, the block error rate (BLER) corresponding to the channel state information report includes the first BLER and the second BLER. The at least one uplink channel is a same uplink channel corresponding to the first BLER and the second BLER.

Optionally, the block error rate (BLER) corresponding to the channel state information report includes the first BLER or the second BLER. The at least one uplink channel includes the first uplink channel corresponding to the first BLER or the second uplink channel corresponding to the second BLER. Both the first uplink channel and the second uplink channel are uplink channels configured for the hybrid automatic repeat (HARQ) information.

Optionally, the block error rate (BLER) corresponding to the channel state information report includes N BLERs, and N is a positive integer greater than or equal to 1. When N is equal to 1, the at least one uplink channel includes a first uplink channel corresponding to the N BLERs; or when N is greater than 1, the at least one uplink channel includes a second uplink channel corresponding to the N BLERs.

This application provides a communications device. The communications device may be configured to perform the foregoing channel state information report transmission method. An implementation principle and a technical effect of the communications device are similar to those of the foregoing channel state information report transmission method. Details are not described in this application again.

Figure 22:
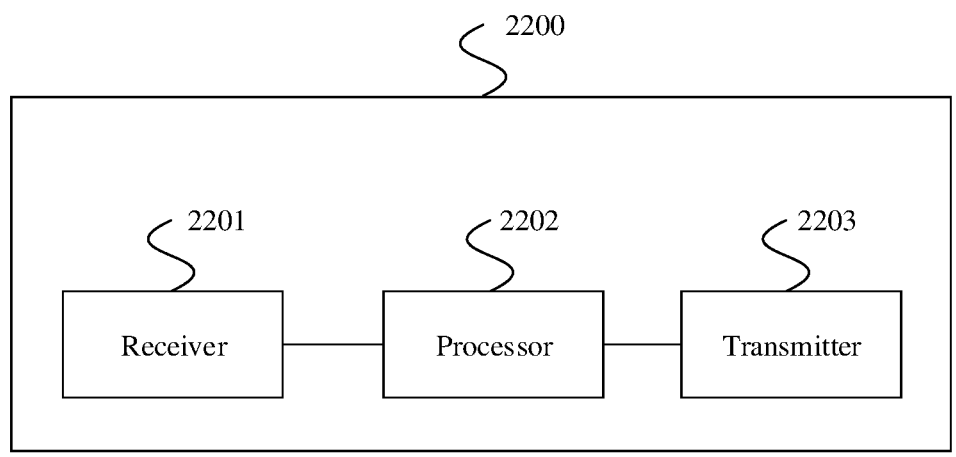
FIG. 22 is a schematic diagram of a communications device 2200 according to an embodiment of this application.

FIG. 22 is a schematic diagram of a communications device 2200 according to an embodiment of this application. As shown in FIG. 22, the communications device is a network device and includes: a receiver 2201, configured to receive a channel state information report on at least one uplink channel; and a processor 2202, configured to determine, based on the at least one uplink channel and a correspondence, a block error rate (BLER) corresponding to the channel state information report, where the correspondence includes a correspondence between the block error rate (BLER) and the at least one uplink channel.

Optionally, the BLER corresponding to the channel state information report includes a first BLER and a second BLER. The at least one uplink channel includes a first uplink channel corresponding to the first BLER and a second uplink channel corresponding to the second BLER. The first uplink channel is an uplink channel configured for hybrid automatic repeat (HARQ) information. The second uplink channel is an uplink channel configured only for the channel state information report.

Optionally, a priority of the first BLER is lower than or equal to a priority of the second BLER.

Optionally, the communications device further includes a transmitter 2203, configured to send indication information, where the indication information includes first indication sub-information and second indication sub-information; the first indication sub-information is used to indicate a first uplink channel set; the second indication sub-information is used to indicate a second uplink channel set; the first uplink channel set includes the first uplink channel; and the second uplink channel set includes the second uplink channel.

This application provides a communications device. The communications device may be configured to perform the foregoing channel state information report transmission method. An implementation principle and a technical effect of the communications device are similar to those of the foregoing channel state information report transmission method. Details are not described in this application again.

Figure 23:
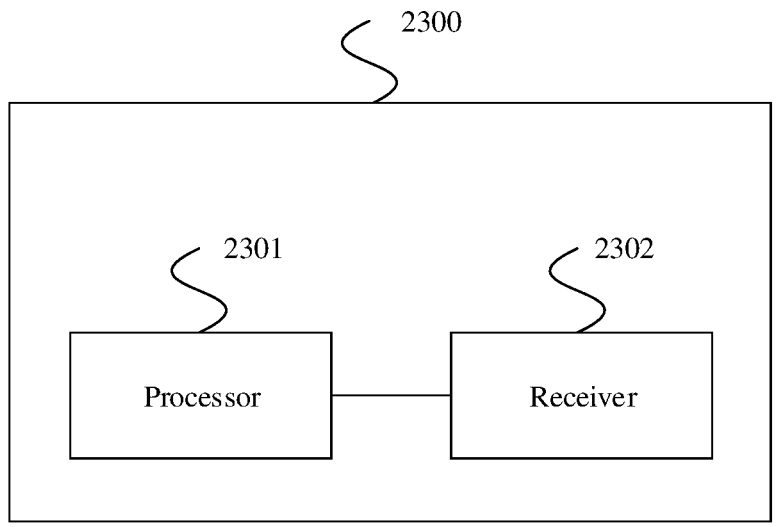
FIG. 23 is a schematic diagram of a communications device 2300 according to an embodiment of this application.

FIG. 23 is a schematic diagram of a communications device 2300 according to an embodiment of this application. As shown in FIG. 23, the communications device is a network device and includes: a processor 2301, configured to determine a block error rate (BLER), where the processor 2301 is further configured to determine, based on a correspondence and the BLER, at least one uplink channel used to send a channel state information report, where the correspondence includes a correspondence between the block error rate (BLER) and the at least one uplink channel; and a receiver 2302, configured to receive the channel state information report on the at least one uplink channel.

Optionally, the correspondence is predefined; or the correspondence is determined based on higher layer signaling; or the correspondence is determined based on downlink control information (DCI).

Optionally, the block error rate (BLER) corresponding to the channel state information report includes a first BLER and a second BLER, and the at least one uplink channel is a same uplink channel corresponding to the first BLER and the second BLER.

Optionally, the block error rate (BLER) corresponding to the channel state information report includes a first BLER or a second BLER. The at least one uplink channel includes a first uplink channel corresponding to the first BLER or a second uplink channel corresponding to the second BLER. Both the first uplink channel and the second uplink channel are uplink channels configured for hybrid automatic repeat (HARQ) information.

Optionally, the block error rate (BLER) corresponding to the channel state information report includes N BLERs, and N is a positive integer greater than or equal to 1. When N is equal to 1, the at least one uplink channel includes a first uplink channel corresponding to the N BLERs; or when N is greater than 1, the at least one uplink channel includes a second uplink channel corresponding to the N BLERs.

This application provides a communications device. The communications device may be configured to perform the foregoing channel state information report transmission method. An implementation principle and a technical effect of the communications device are similar to those of the foregoing channel state information report transmission method. Details are not described in this application again.

Figure 24:
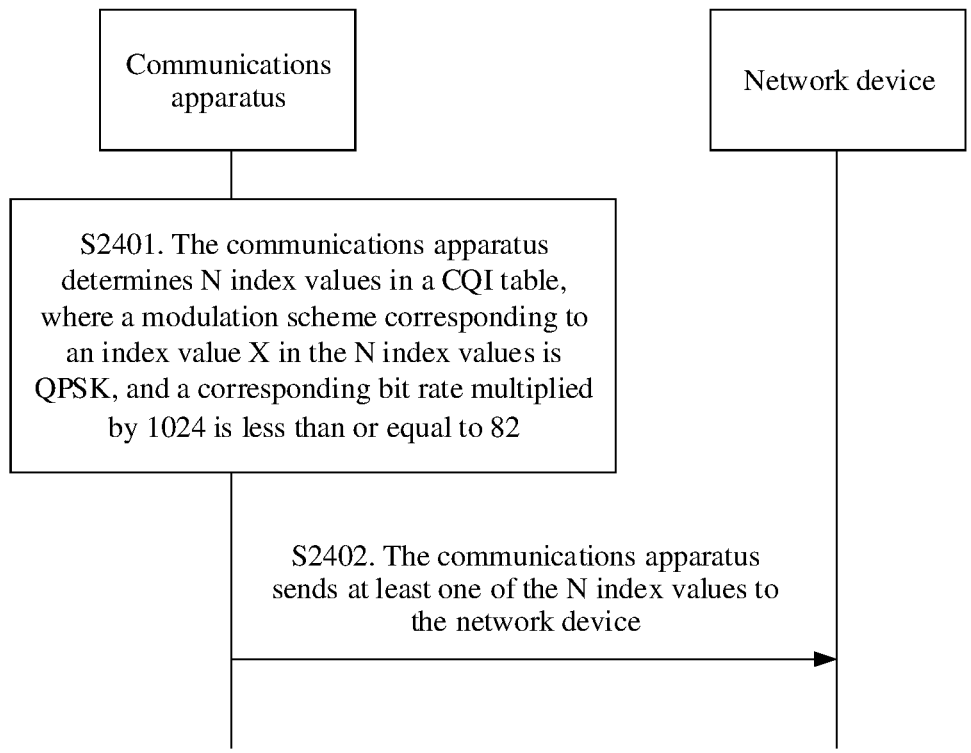
FIG. 24 is a method flowchart of a channel state information report transmission method according to an embodiment of this application.

FIG. 24 is a method flowchart of a channel state information report transmission method according to an embodiment of this application. As shown in FIG. 24, the method includes the following steps.

Step S2401: A communications apparatus determines N index values in a CQI table, where a modulation scheme corresponding to an index value X in the N index values is quadrature phase shift keying (QPSK), and a corresponding bit rate multiplied by 1024 is less than or equal to 82.

Step S2402: The communications apparatus sends at least one of the N index values to a network device.

Optionally, the index value X is 1.

Optionally, the bit rate that is multiplied by 1024 and that corresponds to the index value X is greater than or equal to 43.

Optionally, an efficiency value is greater than or equal to 0.083579.

Optionally, an efficiency value is less than or equal to 0.1592.

Optionally, the bit rate that is multiplied by 1024 and that corresponds to the index value X in the CQI table includes at least one of the following values: 82, 65, 54, 46, and 43.

Optionally, the bit rate that is multiplied by 1024 and that corresponds to the index value X and the efficiency value in the CQI table include at least one pair of the following values:

{the bit rate is equal to 82, and the efficiency value is equal to 0.1592},

{the bit rate is equal to 65, and the efficiency value is equal to 0.1273},

{the bit rate is equal to 54, and the efficiency value is equal to 0.10612},

{the bit rate is equal to 46, and the efficiency value is equal to 0.0895}, and

{the bit rate is equal to 43, and the efficiency value is equal to 0.083579}.

Optionally, the bit rate that is multiplied by 1024 and that corresponds to the index value X in the CQI table includes at least one of the following values: 81, 64, 59, 46, and 43.

Optionally, the bit rate that is multiplied by 1024 and that corresponds to the index value X and the efficiency value in the CQI table include at least one pair of the following values:

{the bit rate is equal to 81, and the efficiency value is equal to 0.15851},

{the bit rate is equal to 71, and the efficiency value is equal to 0.13922},

{the bit rate is equal to 64, and the efficiency value is equal to 0.12578},

{the bit rate is equal to 59, and the efficiency value is equal to 0.11591}, and {the bit rate is equal to 55, and the efficiency value is equal to 0.1083}.

Optionally, an index value 12 to an index value 15 correspond to a modulation scheme 16 quadrature amplitude modulation (QAM).

Optionally, the N index values correspond to at least two coding schemes and one non-coding scheme.

Further, an index value o does not correspond to data or a coding scheme, the index value X corresponds to a coding scheme Polar, and an index value Y corresponds to a coding scheme low density parity check (LDPC). The index value Y is greater than the index value X.

Optionally, the CQI table corresponds to at least two BLERs.

Further, the index value X corresponds to a first BLER, and the index value Y corresponds to a second BLER. The index value Y is greater than the index value X.

Further, the second BLER is less than the first BLER. For example, the second BLER is 10e-5, and the first BLER is 10e-2.

Optionally, the N index values include that a quantity of index values corresponding to the coding scheme LDPC is greater than or equal to a quantity of index values corresponding to the coding scheme Polar. For example, Polar corresponds to four index values, and LDPC corresponds to 11 index values.

It should be noted that the CQI table corresponds to at least one BLER, and the BLER is at least one of the following: 10e-1, 10e-2, 10e-3, 10e-4, and 10e-5.

Optionally, the CQI table may include only an index, a modulation scheme, an efficiency value, and a bit rate, but does not include a coding scheme.

Because an existing LTE system supports only a 10e-1 CQI table, but a plurality of BLERs have been introduced into 5G NR, the prior-art table is not applicable to the 5G system. Further, in consideration of a URLLC service feature, a CQI table needs to be reported at a lower bit rate. Therefore, a CQI can be reported at different BLERs in this embodiment, so that the 5G NR system supports reporting of the plurality of BLERs, to meet a requirement for supporting a URLLC service.

Further, items in any one of Table 9 to Table 18 may be freely combined. To be specific, the CQI table may include only some items or some index values in Table 9 to Table 18. For example, only the index value 1 in the CQI table corresponds to index values 1 in Table 9 to Table 18.

TABLE 9

10e-1 CQI table

| Modulation scheme | Coding scheme | Index | Efficiency value | Bit rate × 1024 |
|---|---|---|---|---|
| | | 0 | — | — |
| QPSK | Polar | 1 | 0.1592 | 82 |
| | | 2 | 0.21117 | 108 |
| | | 3 | 0.27591 | 141 |
| | | 4 | 0.36193 | 185 |
| | | 5 | 0.47372 | 243 |
| | | 6 | 0.61152 | 313 |
| | | 7 | 0.77563 | 397 |
| | | 8 | 0.966 | 495 |
| | | 9 | 1.1765 | 602 |
| | | 10 | 1.392 | 713 |
| | | 11 | 1.595 | 817 |

TABLE 9-continued 10e-1 CQI table

| Modulation scheme | Coding scheme | Index | Efficiency value | Bit rate × 1024 |
|---|---|---|---|---|
| 16QAM | LDPC | 12 | 1.9054 | 488 |
| | | 13 | 2.2431 | 574 |
| | | 14 | 2.5872 | 662 |
| | | 15 | 2.9313 | 750 |

TABLE 10

10e-2 CQI table

| Modulation scheme | Coding scheme | Index | Efficiency value | Bit rate × 1024 |
|---|---|---|---|---|
| — | — | 0 | — | — |
| QPSK | Polar | 1 | 0.1273 | 65 |
| | | 2 | 0.1752 | 90 |
| | | 3 | 0.23429 | 120 |
| | | 4 | 0.31203 | 160 |
| | | 5 | 0.41534 | 213 |
| | | 6 | 0.54579 | 279 |
| | | 7 | 0.70351 | 360 |
| | | 8 | 0.8891 | 455 |
| | Polar or LDPC | 9 | 1.0985 | 562 |
| | | 10 | 1.3176 | 675 |
| | | 11 | 1.5269 | 782 |
| 16QAM | LDPC | 12 | 1.8197 | 466 |
| | | 13 | 2.1631 | 554 |
| | | 14 | 2.5123 | 643 |
| | | 15 | 2.8598 | 732 |

TABLE 11

10e-3 CQI table

| Modulation scheme | Coding scheme | Index | Efficiency value | Bit rate × 1024 |
|---|---|---|---|---|
| | | 0 | — | — |
| QPSK | Polar | 1 | 0.10612 | 54 |
| | | 2 | 0.14989 | 77 |
| | | 3 | 0.20573 | 105 |
| | | 4 | 0.27757 | 142 |
| | | 5 | 0.37388 | 191 |
| | | 6 | 0.49835 | 255 |
| | | 7 | 0.65132 | 333 |
| | | 8 | 0.83286 | 426 |
| | LDPC | 9 | 1.0467 | 536 |
| | | 10 | 1.2744 | 652 |
| | | 11 | 1.4849 | 760 |
| 16QAM | | 12 | 1.7547 | 449 |
| | | 13 | 2.1005 | 538 |
| | | 14 | 2.4536 | 628 |
| | | 15 | 2.805 | 718 |

TABLE 12

10e-4 CQI table

| Modulation scheme | Coding scheme | Index | Efficiency value | Bit rate × 1024 |
|---|---|---|---|---|
| — | — | 0 | — | — |
| QPSK | Polar | 1 | 0.0895 | 46 |
| | | 2 | 0.13157 | 67 |
| | | 3 | 0.18314 | 94 |
| | | 4 | 0.24963 | 128 |
| | | 5 | 0.34073 | 174 |

TABLE 12-continued

10e-4 CQI table

| Modulation scheme | Coding scheme | Index | Efficiency value | Bit rate × 1024 |
|---|---|---|---|---|
| | | 6 | 0.45937 | 235 |
| | | 7 | 0.60655 | 311 |
| | | 8 | 0.78373 | 401 |
| | LDPC | 9 | 1.0015 | 513 |
| | | 10 | 1.2301 | 630 |
| | | 11 | 1.4389 | 737 |
| 16QAM | | 12 | 1.6993 | 435 |
| | | 13 | 2.0457 | 524 |
| | | 14 | 2.4004 | 614 |
| | | 15 | 2.7518 | 704 |

TABLE 13

10e-5 CQI table

| Modulation scheme | Coding scheme | Index | Efficiency value | Bit rate × 1024 |
|---|---|---|---|---|
| | | 0 | — | — |
| QPSK | Polar | 1 | 0.083579 | 43 |
| | | 2 | 0.11465 | 59 |
| | | 3 | 0.16538 | 85 |
| | | 4 | 0.22578 | 116 |
| | | 5 | 0.31119 | 159 |
| | | 6 | 0.42506 | 218 |
| | | 7 | 0.56736 | 290 |
| | | 8 | 0.74005 | 379 |
| | Polar or LDPC | 9 | 0.94753 | 485 |
| | | 10 | 1.1762 | 602 |
| | | 11 | 1.381 | 707 |
| 16QAM | LDPC | 12 | 1.6317 | 418 |
| | | 13 | 1.9869 | 509 |
| | | 14 | 2.3327 | 597 |
| | | 15 | 2.666 | 682 |

TABLE 14

10e-1 CQI table

| Modulation scheme | Coding scheme | Index | Efficiency value | Bit rate × 1024 |
|---|---|---|---|---|
| | | 0 | — | — |
| QSPK | Polar | 1 | 0.15851 | 81 |
| | | 2 | 0.21133 | 108 |
| | | 3 | 0.27913 | 143 |
| | | 4 | 0.36472 | 187 |
| | | 5 | 0.47224 | 242 |
| | | 6 | 0.60629 | 310 |
| | | 7 | 0.76961 | 394 |
| | | 8 | 0.96033 | 492 |
| | | 9 | 1.1704 | 599 |
| | | 10 | 1.3862 | 710 |
| | | 11 | 1.5923 | 815 |
| 16QAM | | 12 | 1.8879 | 483 |
| | | 13 | 2.225 | 570 |
| | | 14 | 2.5692 | 658 |
| | | 15 | 2.9077 | 744 |

TABLE 15

10e-2 CQI table

| Modulation scheme | Coding scheme | Index | Efficiency value | Bit rate × 1024 |
|---|---|---|---|---|
| | | 0 | — | — |
| QSPK | Polar | 1 | 0.13922 | 71 |
| | | 2 | 0.18602 | 95 |
| | | 3 | 0.24652 | 126 |
| | | 4 | 0.32307 | 165 |
| | | 5 | 0.41963 | 215 |
| | | 6 | 0.54127 | 277 |
| | | 7 | 0.69193 | 354 |
| | | 8 | 0.87143 | 446 |
| | | 9 | 1.0733 | 550 |
| | | 10 | 1.2851 | 658 |
| | | 11 | 1.4925 | 764 |
| 16QAM | | 12 | 1.7282 | 442 |
| | | 13 | 2.0498 | 525 |
| | | 14 | 2.3835 | 610 |
| | | 15 | 2.7203 | 696 |

TABLE 16

10e-3 CQI table

| Modulation scheme | Coding scheme | Index | Efficiency value | Bit rate × 1024 |
|---|---|---|---|---|
| | | 0 | — | — |
| QSPK | Polar | 1 | 0.12578 | 64 |
| | | 2 | 0.16893 | 86 |
| | | 3 | 0.22557 | 115 |
| | | 4 | 0.29669 | 152 |
| | | 5 | 0.38541 | 197 |
| | | 6 | 0.49738 | 255 |
| | | 7 | 0.63825 | 327 |
| | | 8 | 0.8094 | 414 |
| | | 9 | 1.0048 | 514 |
| | | 10 | 1.2123 | 621 |
| | | 11 | 1.4189 | 726 |
| | | 12 | 1.6165 | 828 |
| 16QAM | | 13 | 1.921 | 492 |
| | | 14 | 2.2502 | 576 |
| | | 15 | 2.5826 | 661 |

TABLE 17

10e-4 CQI table

| Modulation scheme | Coding scheme | Index | Efficiency value | Bit rate × 1024 |
|---|---|---|---|---|
| | | 0 | — | — |
| QSPK | Polar | 1 | 0.11591 | 59 |
| | | 2 | 0.15574 | 80 |
| | | 3 | 0.20932 | 107 |
| | | 4 | 0.27653 | 142 |
| | | 5 | 0.35915 | 184 |
| | | 6 | 0.46268 | 237 |
| | | 7 | 0.5943 | 304 |
| | | 8 | 0.75768 | 388 |
| | | 9 | 0.94825 | 486 |
| | | 10 | 1.1532 | 590 |
| | | 11 | 1.3583 | 695 |
| | | 12 | 1.5563 | 797 |
| 16QAM | | 13 | 1.8141 | 464 |
| | | 14 | 2.1391 | 548 |
| | | 15 | 2.4714 | 633 |

TABLE 18

10e-5 CQI table

| Modulation scheme | Coding scheme | Index | Efficiency value | Bit rate × 1024 |
|---|---|---|---|---|
| | | 0 | — | — |
| QSPK | Polar | 1 | 0.1083 | 55 |
| | | 2 | 0.14486 | 74 |
| | | 3 | 0.19523 | 100 |
| | | 4 | 0.25927 | 133 |
| | | 5 | 0.33771 | 173 |
| | | 6 | 0.43496 | 223 |
| | | 7 | 0.55829 | 286 |
| | | 8 | 0.71316 | 365 |
| | | 9 | 0.89768 | 460 |
| | | 10 | 1.1006 | 564 |
| | | 11 | 1.3061 | 669 |
| | | 12 | 1.5036 | 770 |
| 16QAM | | 13 | 1.7225 | 441 |
| | | 14 | 2.0443 | 523 |
| | | 15 | 2.3766 | 608 |

Further, items in Table 9 to Table 18 may be combined with each other. To be specific, some elements in any two of Table 9 to Table 18 may be used to form one CQI table. For example, a value of 10e-1 and a value of 10e-5 in a first group form one CQI table. The new table has one more column of indication to indicate that this CQI is a BLER. For example, Table 19 and/or Table 20 may be formed in the foregoing manner. It should be noted that elements in the table in the present invention are examples, and do not need to exist completely. For example, only one or some of rows is/are included.

TABLE 19

CQI table

| Modulation scheme | Coding scheme | Index | Efficiency value | Bit rate × 1024 | BLER |
|---|---|---|---|---|---|
| | | 0 | — | — | |
| QPSK | | 1 | 0.1592 | 82 | 10e-1 |
| | | 2 | 0.21117 | 108 | (first |
| | | 3 | 0.27591 | 141 | BLER) |
| 16QAM | | 4 | 1.9054 | 488 | |
| | | 5 | 2.2431 | 574 | |
| | | 6 | 2.5872 | 662 | |
| 64QAM | | 7 | 4.5234 | 772 | |
| | | 8 | 5.1152 | 873 | |
| QPSK | | 9 | 1.1765 | 602 | 10e-5 |
| | | 10 | 1.392 | 713 | (second |
| | | 11 | 1.595 | 817 | BLER) |
| | | 12 | 1.9054 | 488 | |
| 16QAM | | 13 | 2.2431 | 574 | |
| | | 14 | 2.5872 | 662 | |
| | | 15 | 2.9313 | 750 | |

TABLE 20

CQI table

| Modulation scheme | Coding scheme | Index | Efficiency value | Bit rate × 1024 | BLER |
|---|---|---|---|---|---|
| | | 0 | — | — | |
| QPSK | Polar | 1 | 0.1273 | 65 | 10e-2 |
| | | 2 | 0.31203 | 160 | |
| | | 3 | 0.70351 | 360 | |
| | | 4 | 1.5269 | 782 | |
| 16QAM | LDPC | 5 | 1.8197 | 466 | |
| | | 6 | 2.1631 | 554 | |
| | | 7 | 2.5123 | 643 | |
| | | 8 | 2.8598 | 732 | |

TABLE 20-continued

CQI table

| Modulation scheme | Coding scheme | Index | Efficiency value | Bit rate × 1024 | BLER |
|---|---|---|---|---|---|
| QPSK | Polar | 9 | 0.083579 | 43 | 10e-5 |
| | | 10 | 0.22578 | 116 | |
| | | 11 | 0.56736 | 290 | |
| | | 12 | 1.381 | 707 | |
| 16QAM | LDPC | 13 | 1.6317 | 418 | |
| | | 14 | 1.9869 | 509 | |
| | | 15 | 2.3327 | 597 | |

Aspects or features of this application may be implemented as a method, an apparatus, or a product that uses standard programming and/or engineering technologies. The term "product" used in this application covers a computer program that can be accessed from any computer readable device, carrier, or medium. For example, the computer readable medium may include but is not limited to a magnetic storage device (for example, a hard disk, a floppy disk, or a magnetic tape), an optical disc (for example, a compact disc (CD) or a digital versatile disc (DVD)), a smart card, and a flash memory device (for example, an erasable programmable read-only memory (EPROM), a card, a stick, or a key drive). In addition, various storage media described in this specification may indicate one or more devices and/or other machine readable media that are configured to store information. The term "machine readable media" may include but is not limited to a radio channel, and various other media that can store, include, and/or transmit an instruction and/or data.

What is claimed is:

1. A method, comprising:
   determining, by a terminal, N channel state information reports;
   determining, by the terminal, a priority of each of the N channel state information reports, to determine N priorities; and
   sending, by the terminal to a network device, M channel state information reports of the N channel state information reports based on the N priorities of the N channel state information reports, wherein both N and M are positive integers greater than or equal to 1, and M is less than N; and wherein, for each of the N channel state information reports, the priority of the respective channel state information report is determined based on a priority of a block error rate (BLER) corresponding to the respective channel state information report; and
   wherein:
      a quantity of bits of the N channel state information reports is greater than a maximum quantity of carried bits on an uplink channel, and the maximum quantity of carried bits is determined based on: a maximum bit rate that the uplink channel has a capability to support for carrying information, a time domain resource occupied by the uplink channel, a frequency domain resource occupied by the uplink channel, or a format of the uplink channel;
      a quantity of bits of the M channel state information reports is less than or equal to the maximum quantity of carried bits; and
      the uplink channel is used to transmit the M channel state information reports.

2. The method according to claim 1, further comprising:
receiving first indication information; and
determining, based on a format of the first indication information, a BLER corresponding to at least one of the N channel state information reports.

3. The method according to claim 1, wherein, for each of the N channel state information reports, the priority of the BLER corresponding to the respective channel state information report is predefined.

4. The method according to claim 1, wherein, for each of the N channel state information reports, the priority of the BLER corresponding to the respective channel state information report is determined based on higher layer signaling or downlink control information (DCI).

5. A method, comprising:
receiving, by a network device, M channel state information reports from a terminal device, wherein the M channel state information reports are determined from N channel state information reports based on priorities of the N channel state information reports, the N channel state information reports comprise the M channel state information reports, both N and M are positive integers greater than or equal to 1, and M is less than N, and wherein, for each of the N channel state information reports, a priority of the respective channel state information report is determined by the terminal device based on a priority of a block error rate (BLER) corresponding to the respective channel state information report; and
wherein:
a sum of a quantity of bits of the N channel state information reports and a quantity of bits of at least one piece of information is greater than a maximum quantity of carried bits on an uplink channel, and the maximum quantity of carried bits is determined based on: a maximum bit rate that the uplink channel has a capability to support for carrying information, a time domain resource occupied by the uplink channel, a frequency domain resource occupied by the uplink channel, or a format of the uplink channel;
a sum of a quantity of bits of the M channel state information reports and the quantity of bits of the at least one piece of information is less than or equal to the maximum quantity of carried bits; and
the uplink channel is used to transmit the M channel state information reports and the at least one piece of information.

6. The method according to claim 5, further comprising:
sending first indication information, wherein the first indication information is usable to determine a first BLER corresponding to a first channel state information report.

7. The method according to claim 5, wherein, for each of the N channel state information reports, the priority of the BLER corresponding to the respective channel state information report is predefined.

8. The method according to claim 5, wherein, for each of the N channel state information reports, the priority of the BLER corresponding to the respective channel state information report is determined based on higher layer signaling or downlink control information (DCI).

9. An apparatus, comprising:
a non-transitory memory, configured to store computer executable program codes; and
a processor, configured to execute the program codes, wherein the program codes include instructions for:
determining N channel state information reports;
determining a priority of each of the N channel state information reports, to determine N priorities; and
sending, to a network device, M channel state information reports of the N channel state information reports based on the N priorities of the N channel state information reports, wherein both N and M are positive integers greater than or equal to 1, and M is less than N; and
wherein, for each of the N channel state information reports, the priority of the respective channel state information report is determined based on a priority of a block error rate (BLER) corresponding to the respective channel state information report; and
wherein:
a quantity of bits of the N channel state information reports is greater than a maximum quantity of carried bits on an uplink channel, and the maximum quantity of carried bits is determined based on: a maximum bit rate that the uplink channel has capability to support for carrying information, a time domain resource occupied by the uplink channel, a frequency domain resource occupied by the uplink channel, or a format of the uplink channel;
a quantity of bits of the M channel state information reports is less than or equal to the maximum quantity of carried bits; and
the uplink channel is used to transmit the M channel state information reports.

10. The apparatus according to claim 9, wherein the program codes further include instructions for:
receiving first indication information; and
determining, based on a format of the first indication information, a BLER corresponding to at least one of the N channel state information reports.

11. The apparatus according to claim 9, wherein, for each of the N channel state information reports, the priority of the BLER corresponding to the respective channel state information report is predefined.

12. The apparatus according to claim 9, wherein, for each of the N channel state information reports, the priority of the BLER corresponding to the respective channel state information report is determined based on higher layer signaling or downlink control information (DCI).

* * * * *